(12) United States Patent
Kim et al.

(10) Patent No.: US 11,409,694 B2
(45) Date of Patent: Aug. 9, 2022

(54) PROCESSOR ELEMENT MATRIX PERFORMING MAXIMUM/AVERAGE POOLING OPERATIONS

(71) Applicant: Samsung Electronics Co., Ltd., Suwon-si (KR)

(72) Inventors: Kyounghoon Kim, Suwon-si (KR); Gyeonghoon Kim, Suwon-si (KR); Hyunsik Kim, Suwon-si (KR); Haksup Song, Suwon-si (KR); Guyeon Wei, Suwon-si (KR); Jonghun Lee, Suwon-si (KR); Jinsae Jung, Suwon-si (KR); Junguk Cho, Hwaseong-si (KR); Sangbok Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/936,965

(22) Filed: Jul. 23, 2020

(65) Prior Publication Data

US 2021/0034568 A1    Feb. 4, 2021

(30) Foreign Application Priority Data

Jul. 31, 2019  (KR) .......................... 10-2019-0092946

(51) Int. Cl.
*G06F 15/80* (2006.01)
*G06F 9/50* (2006.01)

(52) U.S. Cl.
CPC ........ *G06F 15/8076* (2013.01); *G06F 9/5027* (2013.01); *G06F 9/5061* (2013.01); *G06F 15/8007* (2013.01)

(58) Field of Classification Search
CPC ........................... G06F 15/8007; G06F 15/8076
See application file for complete search history.

(56) References Cited

U.S. PATENT DOCUMENTS 10,037,490 B2  7/2018  Young et al.
10,192,162 B2  1/2019  Thorson et al.
(Continued)

FOREIGN PATENT DOCUMENTS

KR  10-2019-0052587 A  5/2019
KR  10-2019-0063393 A  6/2019

OTHER PUBLICATIONS

Weijia Chen et al., An Asynchronous Energy-Efficient CNN Accelerator with Reconfigurable Architecture, 2018 IEEE Asian Solid-State Circuits Conference (A-SSCC), Dec. 17, 2018, pp. 51-53; and figures 1-2, 9.

(Continued)

*Primary Examiner* — Jacob Petranek
(74) *Attorney, Agent, or Firm* — Jefferson IP Law, LLP

(57) ABSTRACT

A processor is provided. The processor includes a plurality of processing elements configured to be arranged in a matrix form, and a controller configured to control the plurality of processing elements during a plurality of cycles to process a target data, control first processing elements so that each of the first processing elements operates data provided from adjacent first processing elements and the input first element and inputs each of second elements included in a second row among the plurality of elements to second processing elements arranged in the second row among the plurality of processing elements, control the second processing elements so that each of the second processing elements operates data provided from adjacent second processing elements and the input second element, and operates data provided from the adjacent first processing elements in the same column among the first processing elements and pre-stored operation data.

16 Claims, 33 Drawing Sheets

(56) References Cited

U.S. PATENT DOCUMENTS

| | | |
|---|---|---|
| 10,198,401 B2 | 2/2019 | Lau et al. |
| 2015/0309961 A1 | 10/2015 | Ozaki et al. |
| 2017/0103316 A1 | 4/2017 | Ross et al. |
| 2017/0103318 A1 | 4/2017 | Ross et al. |
| 2018/0189238 A1 | 7/2018 | Lau et al. |
| 2018/0232629 A1 | 8/2018 | Du et al. |
| 2018/0300628 A1 | 10/2018 | Young et al. |
| 2018/0357533 A1 | 12/2018 | Inoue |
| 2019/0065938 A1 | 2/2019 | Liu et al. |
| 2019/0079801 A1* | 3/2019 | Lyuh .................. G06F 9/30101 |
| 2019/0095211 A1 | 3/2019 | Imaino et al. |
| 2019/0114548 A1 | 4/2019 | Wu et al. |
| 2019/0129885 A1* | 5/2019 | Kim .................... G06F 9/30134 |
| 2019/0138892 A1 | 5/2019 | Kim et al. |
| 2019/0205738 A1 | 7/2019 | Bannon et al. |
| 2020/0097442 A1* | 3/2020 | Jacob (Yaakov) .. G06F 9/30032 |
| 2020/0293284 A1* | 9/2020 | Vantrease .............. G06N 3/063 |

OTHER PUBLICATIONS

International Search Report dated Oct. 15, 2020, issued in International Application No. PCT/KR2020/008981.
Zidong Du et al., ShiDianNao: Shifting Vision Processing Closer to the Sensor, ISCA2015.
Shaoli Liu et al., Cambricon: An Instruction Set Architecture for Neural Networks, ISCA2016.
European Search Report dated Apr. 19, 2022; European Appln. No. 20846482.6-1203 / 3948686 PCT/KR2020008981.

* cited by examiner

< 4×4 Pooling, Stride 2 >

FIG. 9C

< 4×4 Pooling, Stride 3 >

FIG. 9D

< 4×4 Pooling, Stride 4 >

< 4×4 Pooling, Stride 4 >

FIG. 10A

< 3×3 Pooling, Stride 1 >

FIG. 10B

< 3×3 Pooling, Stride 2 >

< 3×3 Pooling, Stride 3 >

FIG. 10D

< 3×3 Pooling, Stride 3 >

< 2×2 Pooling, Stride 1 >

< 2×2 Pooling, Stride 2 >

< 2×2 Pooling, Stride 2 >

< 3×3 Pooling, Stride 2 >

PROCESSOR ELEMENT MATRIX PERFORMING MAXIMUM/AVERAGE POOLING OPERATIONS

CROSS-REFERENCE TO RELATED APPLICATION(S)

This application is based on and claims priority under 35 U.S.C § 119(a) of a Korean patent application number 10-2019-0092946, filed on Jul. 31, 2019, in the Korean Intellectual Property Office, the disclosure of which is incorporated by reference herein in its entirety.

BACKGROUND

1. Field

The disclosure relates to a processor and a control method thereof. More particularly, the disclosure relates to a processor performing pooling, and a control method thereof.

2. Description of the Related Art

In general, a home appliance, such as a refrigerator or a washing machine includes a motor for performing specific functions. In recent years, on the other hand, a plurality of home appliances with motors may be generally provided within one household. For example, a general refrigerator and a kimchi refrigerator may be provided within one household.

Deep learning is a type of machine learning technology based on an artificial neural network, and may improve learning efficiency by pre-processing data for learning using unsupervised learning or by transferring data across several layers at a time even though the artificial neural network is designed in a multilayer structure to become deep. More particularly, the deep learning has recently been drastically developed due to big data by the Internet and improvement of a computing ability to process the big data.

Among them, a convolutional neural network (CNN) has a structure appropriate for learning two-dimensional data, and may include a convolution operation, a pooling operation, and the like.

Here, pooling is used to detect meaningful signals in a local region. For example, when convolution is performed using a filter for detecting pupils in an image, high numerical values are recorded at pupil positions as result values, but because these numerical values are some of vast result values, these numerical numbers may not be effectively transferred to the next layer.

In this case, the largest signals in the local region may be transferred to the next layer as illustrated in FIG. 1A using max pooling. In addition, strong signals transferred to the next layer may be again forward transferred through a back-propagation algorithm at the time of filter-learning to cause the filter for detecting the pupils to more effectively perform learning. Therefore, the pooling performs an important function of increasing inference and learning efficiency.

Alternatively, the pooling may be used for reducing feature map data as illustrated in FIG. 1B. In case where the pooling is not performed, convolution is performed, such that a size may be increased in a depth direction (Z-axis direction), but in case where the pooling is performed, a size in X-axis and Y-axis directions is reduced, such that an operation amount and an amount of required memory may be reduced.

However, in the related art, a one-dimensional calculator structure (1D Array) has been used for the pooling operation.

In this case, as illustrated in FIG. 1C, a two-dimensional calculator structure (2D array) for the convolution and a 1D array for the pooling need to be implemented by separate hardware, which causes cost increases, such as a hardware area and power consumption.

In addition, as illustrated in FIG. 1D, a load-balancing problem of hardware resources also occurs.

In addition, in case of pooling using a 1D array structure, an operation is performed by simultaneously controlling a plurality of processing elements (PEs) with one instruction using a method called single instruction multiple data (SIMD). In this case, one processing element processes data included in one depth of the feature map data, and the respective processing elements perform pooling for each local region of the data included in one depth.

For example, in case where a size of the local region is 3×3 and pooling is performed with a stride of 1, as illustrated in FIG. 1E, a first processing element sequentially receives 4, 2, 4, 7, 3, 2, 4, 3, and 8 to perform pooling, and sequentially receives 2, 4, 3, 3, 2, 6, 3, 8, and 4 to perform pooling. In this case, 8 of FIG. 1E is read from a memory nine times and is then subjected to an add operation nine times, for each region, by changing a local region. For example, there is an issue, such as an unnecessary memory access and an increase in operation.

Alternatively, as illustrated in FIG. 1F, the convolution as well as the pooling may use a SIMD manner. However, in case of the convolution, it is impossible to reuse data.

As described above, in the case of the pooling using the 1D array structure, various problems occur.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a processor and a control method thereof for performing pooling using a plurality of processing elements having a 2D array structure.

Additional aspects will be set forth in part in the description which follows and, in part, will be apparent from the description, or may be learned by practice of the presented embodiments.

In accordance with an aspect to the disclosure, a processor is provided. The processor includes a plurality of processing elements configured to be arranged in a matrix form, and a controller configured to control the plurality of processing elements during a plurality of cycles to process a target data, in which the controller inputs each of the first elements included in a first row among a plurality of elements included in the target data to first processing elements arranged in the first row among the plurality of processing elements, controls the first processing elements so that each of the first processing elements operates data provided from adjacent first processing elements and the input first element and inputs each of second elements included in a second row among the plurality of elements to second processing elements arranged in the second row among the plurality of processing elements, controls the second processing elements so that each of the second processing elements operates data provided from adjacent second processing elements and the input second element, and controls the second processing elements so that each of the second processing elements operates operation data provided from the adjacent first processing elements in the same column among the first processing elements and pre-stored operation data to acquire a pooling result for the target data.

The controller is further configured to input each of the first elements to the first processing elements in a first cycle, control the first processing elements so that each of the first processing elements operates the data provided from the adjacent first processing elements and the input first element, and inputs each of the second elements to the second processing elements, in a second cycle immediately after the first cycle, control the second processing elements so that each of the second processing elements operates the data provided from the adjacent second processing elements and the input second element in a third cycle immediately after the second cycle, and control the second processing elements so that each of the second processing elements operates the operation data provided from the adjacent first processing elements in the same column among the first processing elements and the pre-stored operation data to acquire the pooling result in a fourth cycle immediately after the third cycle.

The controller is further configured to input each of the first elements to the first processing elements in a first cycle, control the first processing elements so that each of the first processing elements operates the data provided from the adjacent first processing elements and the input first element during a plurality of cycles immediately after the first cycle, input the second elements to each of the second processing elements in a second cycle that is one of the plurality of cycles, control the second processing elements so that each of the second processing elements operates the data provided from the adjacent second processing elements and the input second element during a plurality of cycles immediately after the second cycle, control the second processing elements so that each of the second processing elements operates the operation data provided from the adjacent first processing elements in the same column among the first processing elements and the pre-stored operation data in a third cycle having a predetermined interval from the plurality of cycles immediately after the second cycle to acquire the pooling result, and the number of cycles immediately after the first cycle is equal to the number of cycles immediately after the second cycle.

The controller is further configured to control the first processing elements so that first processing elements adjacent to each of the first processing elements provide the first elements in an initial cycle of the plurality of cycles immediately after the first cycle, and control the second processing elements so that second processing elements adjacent to each of the first processing elements provide the second elements in the initial cycle of the plurality of cycles immediately after the first cycle.

The controller is further configured to control the first processing elements so that first processing elements adjacent to each of the first processing elements provide operation data in an immediately previous cycle, during a cycle after the initial cycle of the plurality of cycles immediately after the first cycle, and control the second processing elements so that second processing elements adjacent to each of the second processing elements provide operation data in the immediately previous cycle, during the cycle immediately after the initial cycle of the plurality of cycles immediately after the second cycle.

The controller is further configured to input each of the third elements included in a third row among the plurality of elements included in the target data to third processing elements arranged in the third row among the plurality of processing elements, control the third processing elements so that each of the third processing elements operates data provided from adjacent third processing elements and the input third element, control the third processing elements so that each of the third processing elements controls the third processing elements to operate operation data provided from adjacent second processing elements in the same column among the second processing elements and the pre-stored operation data to acquire the pooling result, and the operation data provided from the adjacent second processing elements is an operation result of the operation data provided from the adjacent first processing elements in the same column as the adjacent second processing elements and the pre-stored operation data of the adjacent second processing elements.

The controller is further configured to control the first processing elements so that each of the first processing elements performs an add operation of the data provided from the adjacent first processing elements and the input second element, control the second processing elements so that each of the second processing elements performs an add operation of the data provided from the adjacent second processing elements and the input second element, and control the second processing elements so that each of the second processing elements performs an add operation of the operation data provided from the adjacent first processing elements in the same column among the first processing elements and the pre-stored operation data to acquire an average pooling result.

The controller is further configured to control the first processing elements so that each of the first processing elements performs a comparison operation of the first element provided from the adjacent first processing elements and the input first element, control the second processing elements so that each of the second processing elements performs a comparison operation of the second element provided from the adjacent second processing elements and the input second element, and control the second processing elements so that each of the second processing elements performs a comparison operation of the first element provided from the adjacent first processing elements in the same column among the first processing elements and the pre-stored second element to acquire a max pooling result.

Each of the plurality of processing elements includes a first register, and a second register, and the controller is further configured to control the first processing elements so that each of the first processing elements operates data provided from the first registers or the second registers of the adjacent first processing elements and first elements stored in the first registers of each of the first processing elements and stores the operated data and first elements in the second registers of each of the first processing elements, and control the second processing elements so that each of the second processing elements operates data provided from the first registers or the second registers of the adjacent second processing elements and second elements stored in the first registers of each of the second processing elements and stores the operated data and second elements in the second registers of each of the second processing elements.

The controller is further configured to control the second processing elements so that each of the second processing elements operates the operation data provided from the first registers of the adjacent first processing elements in the same column among the first processing elements and the operation data stored in the first registers of each of the second processing elements and stores the operated operation data in the second registers of each of the second processing elements.

In accordance with another aspect the disclosure, a control method of a processor is provided. The method includes a plurality of processing elements arranged in a matrix form and performs pooling on target data using the plurality of processing elements during a plurality of cycles includes inputting each of first elements included in a first row among a plurality of elements included in the target data to first processing elements arranged in the first row among the plurality of processing elements, controlling the first processing elements so that each of the first processing elements operates data provided from adjacent first processing elements and the input first element, and inputting each of second elements included in a second row among the plurality of elements to second processing elements arranged in the second row among the plurality of processing elements, controlling the second processing elements so that each of the second processing elements operates data provided from adjacent second processing elements and the input second element, and controlling the second processing elements so that each of the second processing elements operates operation data provided from the adjacent first processing elements in the same column among the first processing elements and pre-stored operation data to perform the pooling.

In the inputting to the first processing elements, each of the first elements is input to the first processing elements in a first cycle, in the inputting to the second processing elements, the first processing elements are controlled so that each of the first processing elements operates the data provided from the adjacent first processing elements and the input first element, and each of the second elements is input to the second processing elements, in a second cycle immediately after the first cycle, in the controlling of the second processing elements, the second processing elements are controlled so that each of the second processing elements operates the data provided from the adjacent second processing elements and the input second element in a third cycle immediately after the second cycle, and in the performing of the pooling, the second processing elements are controlled so that each of the second processing elements operates the operation data provided from the adjacent first processing elements in the same column among the first processing elements and the pre-stored operation data, to acquire the pooling result in a fourth cycle immediately after the third cycle.

In the inputting to the first processing elements, each of the first elements is input to the first processing elements in a first cycle, in the inputting to the second processing elements, the first processing elements are controlled so that each of the first processing elements operates the data provided from the adjacent first processing elements and the input first element during a plurality of cycles immediately after the first cycle, and the second elements are input to each of the second processing elements in a second cycle that is one of the plurality of cycles, in the controlling of the second processing elements, the second processing elements are controlled so that each of the second processing elements operates the data provided from the adjacent second processing elements and the input second element during a plurality of cycles immediately after the second cycle, and in the performing of the pooling, the second processing elements are controlled so that each of the second processing elements operates the operation data provided from the adjacent first processing elements in the same column among the first processing elements and the pre-stored operation data in a third cycle having a predetermined interval from the plurality of cycles immediately after the second cycle to perform the pooling, and the number of cycles immediately after the first cycle is equal to the number of cycles immediately after the second cycle.

In the controlling of the first processing elements, the first processing elements are controlled so that first processing elements adjacent to each of the first processing elements provide the first elements in an initial cycle of the plurality of cycles immediately after the first cycle, and in the controlling of the second processing elements, the second processing elements are controlled so that second processing elements adjacent to each of the first processing elements provide the second elements in the initial cycle of the plurality of cycles immediately after the first cycle.

In the controlling of the first processing elements, the first processing elements are controlled so that first processing elements adjacent to each of the first processing elements provide the operation data in an immediately previous cycle, during a cycle after the initial cycle of the plurality of cycles immediately after the first cycle, and in the controlling of the second processing elements, the second processing elements are controlled so that second processing elements adjacent to each of the second processing elements provide operation data in the immediately previous cycle, during the cycle after the initial cycle of the plurality of cycles immediately after the second cycle.

The method further includes inputting each of the third elements included in a third row among the plurality of elements included in the target data to third processing elements arranged in the third row among the plurality of processing elements, and controlling the third processing elements so that each of the third processing elements operates data provided from adjacent third processing elements and the input third element, wherein in the performing of the pooling, the third processing elements are controlled so that each of the third processing elements operates operation data provided from adjacent second processing elements in the same column among the second processing elements and the pre-stored operation data to perform the pooling, and the operation data provided from the adjacent second processing elements is an operation result of the operation data provided from the adjacent first processing elements in the same column as the adjacent second processing elements and the pre-stored operation data of the adjacent second processing elements.

In the controlling of the first processing elements, the first processing elements are controlled so that each of the first processing elements performs an add operation of the data provided from the adjacent first processing elements and the input first element, in the controlling of the second processing elements, the second processing elements are controlled so that each of the second processing elements performs an add operation of the data provided from the adjacent second processing elements and the input second element, and in the performing of the pooling, the second processing elements are controlled so that each of the second processing elements performs an add operation of the operation data provided from the adjacent first processing elements in the same column among the first processing elements and the pre-stored operation data to perform average pooling.

In the controlling of the first processing elements, the first processing elements are controlled so that each of the first processing elements performs a comparison operation of the first element provided from the adjacent first processing elements and the input first element, in the controlling of the second processing elements, the second processing elements are controlled so that each of the second processing elements performs a comparison operation of the second element provided from the adjacent second processing elements and the input second element, and in the performing of the pooling, the second processing elements are controlled so that each of the second processing elements performs a comparison operation of the first element provided from the adjacent first processing elements in the same column among the first processing elements and the pre-stored second element to perform max pooling.

Each of the plurality of processing elements includes a first register, and a second register, and in the controlling of the first processing elements, the first processing elements are controlled so that each of the first processing elements operates data provided from the first registers or the second registers of the adjacent first processing elements and first elements stored in the first registers of each of the first processing elements and stores the operated data and first elements in the second registers of each of the first processing elements, and in the controlling of the second processing elements, the second processing elements are controlled so that each of the second processing elements operates data provided from the first registers or the second registers of the adjacent second processing elements and second elements stored in the first registers of each of the second processing elements and stores the operated data and second elements in the second registers of each of the second processing elements.

In the performing of the pooling, the second processing elements are controlled so that each of the second processing elements operates the operation data provided from the first registers of the adjacent first processing elements in the same column among the first processing elements and the operation data stored in the first registers of each of the second processing elements and stores the operated operation data in the second registers of each of the second processing elements.

According to various embodiments of the disclosure as described above, the processor performs the pooling as well as the convolution by using a plurality of processing elements having a 2D array structure to address the hardware dualization issue, the load-balancing problem, and the redundant operation problems and lower the peak bandwidth.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 3, 4, 5, 6, 7, and 8 are diagrams illustrating an operation of a plurality of processing elements according to various embodiments of the disclosure;

Figure 9B:
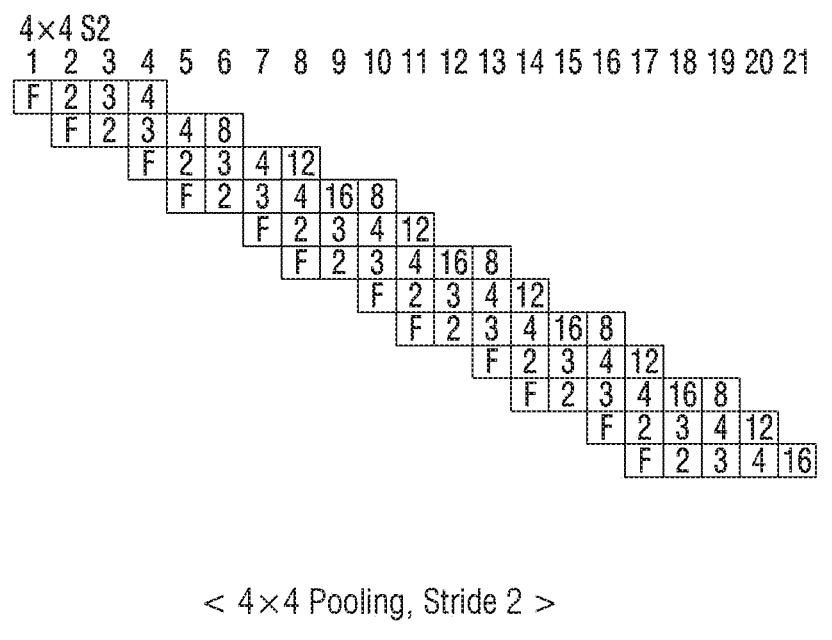
Figure 9C:
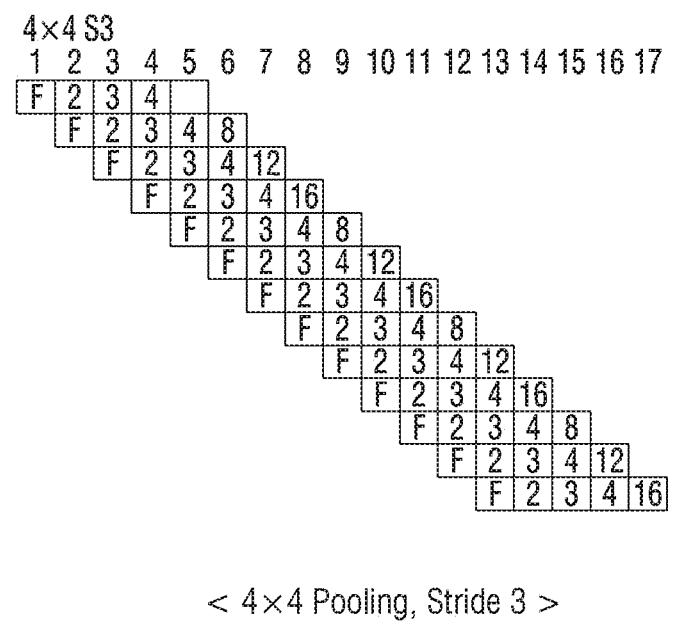
Figure 9D:
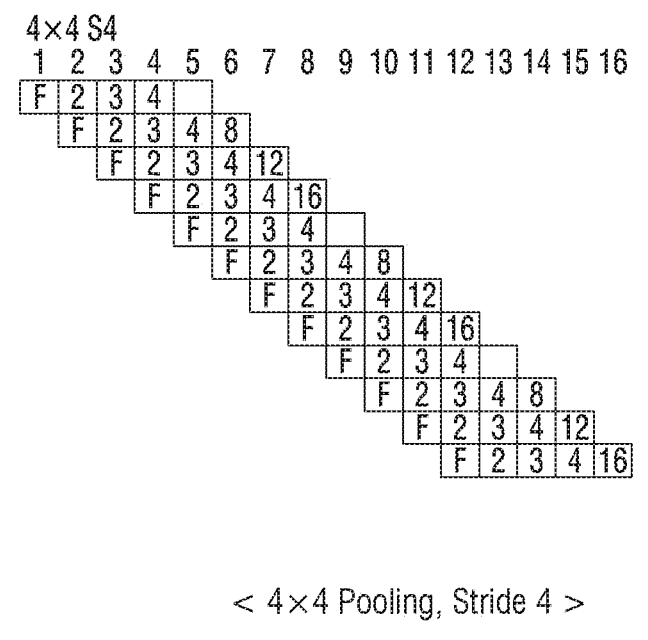
Figure 10A:
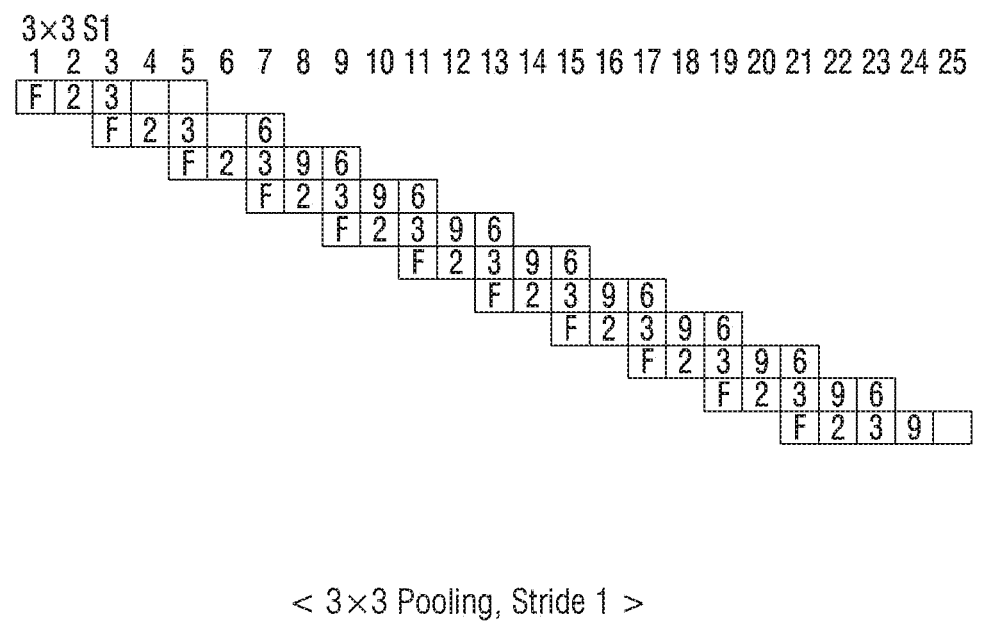
Figure 10B:
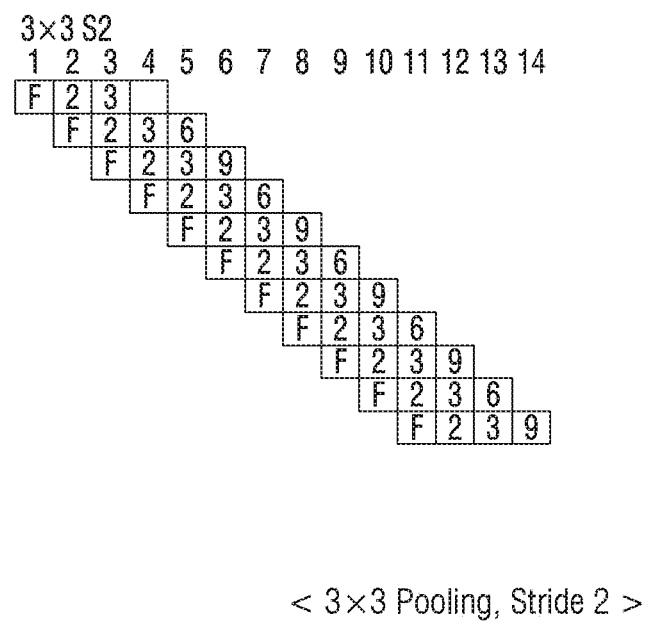

FIGS. 9A, 9B, 9C, 9D, 9E, 10A, 10B, 10C, 10D, 11A, 11B, and 11C are diagrams illustrating a method of operating a controller for each cycle according to various embodiments of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

After terms used in the specification are briefly described, the disclosure will be described below.

FIGS. 1A, 1B, 1C, 1D, 1E and 1F illustrate pooling according to various embodiments of the disclosure.

Figure 2A:
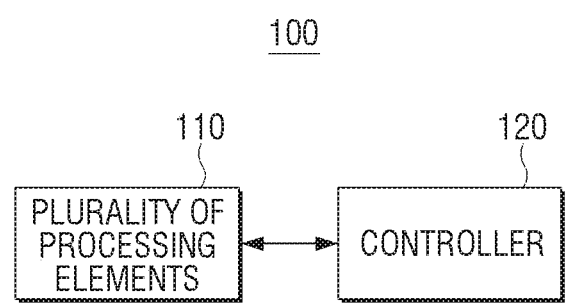
FIG. 2A is a block diagram illustrating a configuration of a processor according to an embodiment of the disclosure.

FIG. 2A is a block diagram illustrating a configuration of a processor according to an embodiment of the disclosure.

Referring to FIG. 2A, a processor 100 includes a plurality of processing elements 110 and a controller 120.

The processor 100 may be a device that performs pooling. For example, the processor 100 may identify target data stored in a memory in a three-dimensional form, and perform pooling for the target data having the three-dimensional form based on X-axis and Y-axis directions. In addition, the processor 100 may perform max pooling in a manner of outputting a maximum value within a local region having a predetermined size in the X-axis and Y-axis directions. Alternatively, the processor 100 may perform average pooling in a manner of outputting an average value within the local region having the predetermined size in the X-axis and Y-axis directions. Here, the predetermined size means a size of a region serving as a unit of the pooling, and is also referred to as a kernel size. The target data is data to be pooled, and may be initial data (for example, images) for applying an artificial intelligence model or a feature map obtained in a process of operating an artificial intelligence model.

Figure 1A:
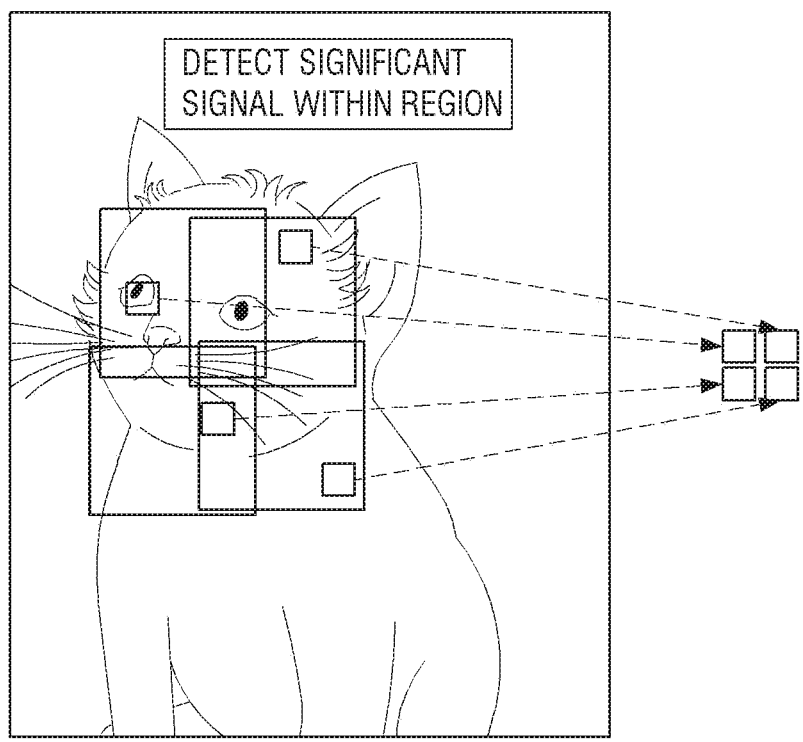
FIGS. 1A, 1B, 1C, 1D, 1E, and 1F are diagrams illustrating pooling according to various embodiments of the disclosure.
Figure 1B:
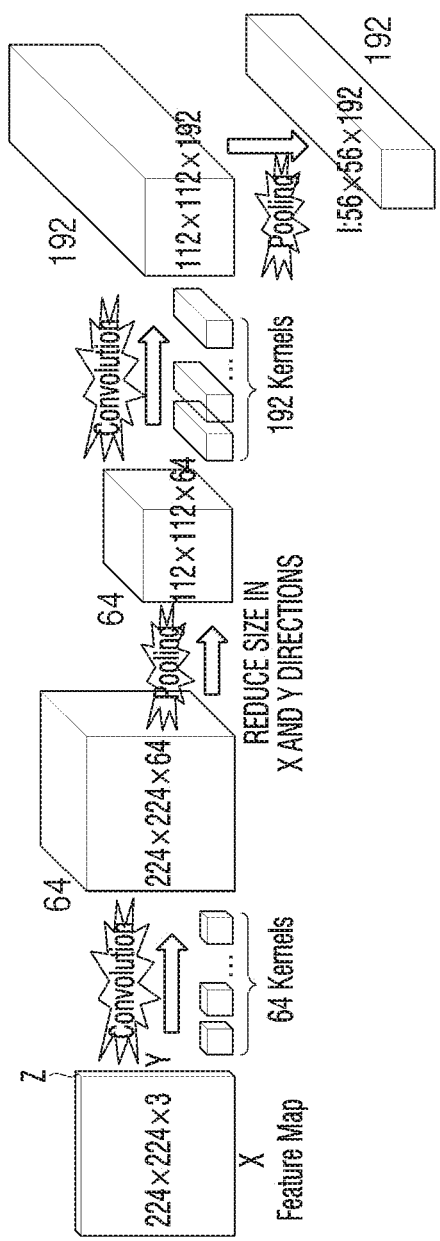
Figure 1C:
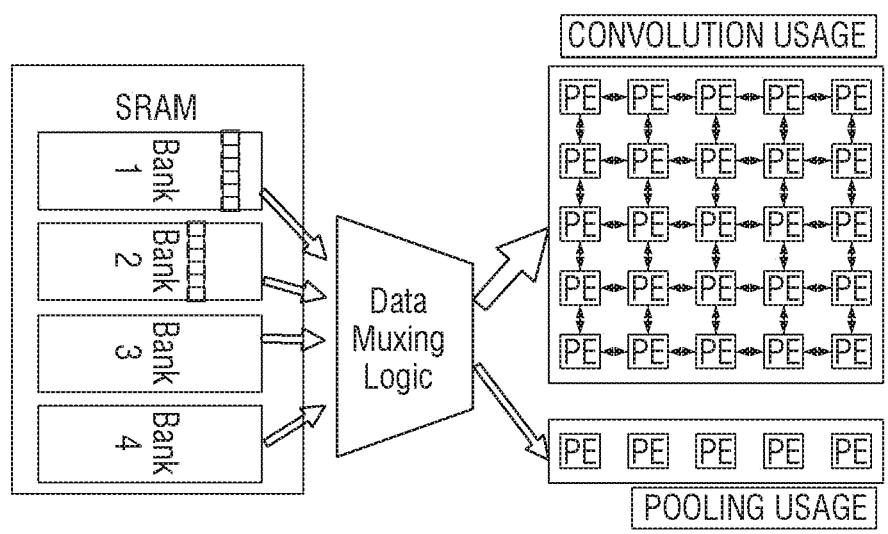
Figure 1D:
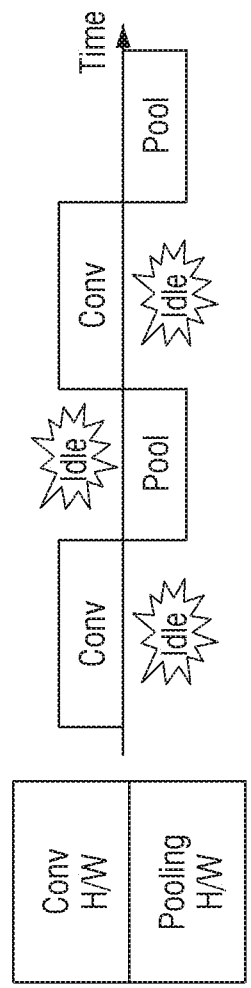
Figure 1E:
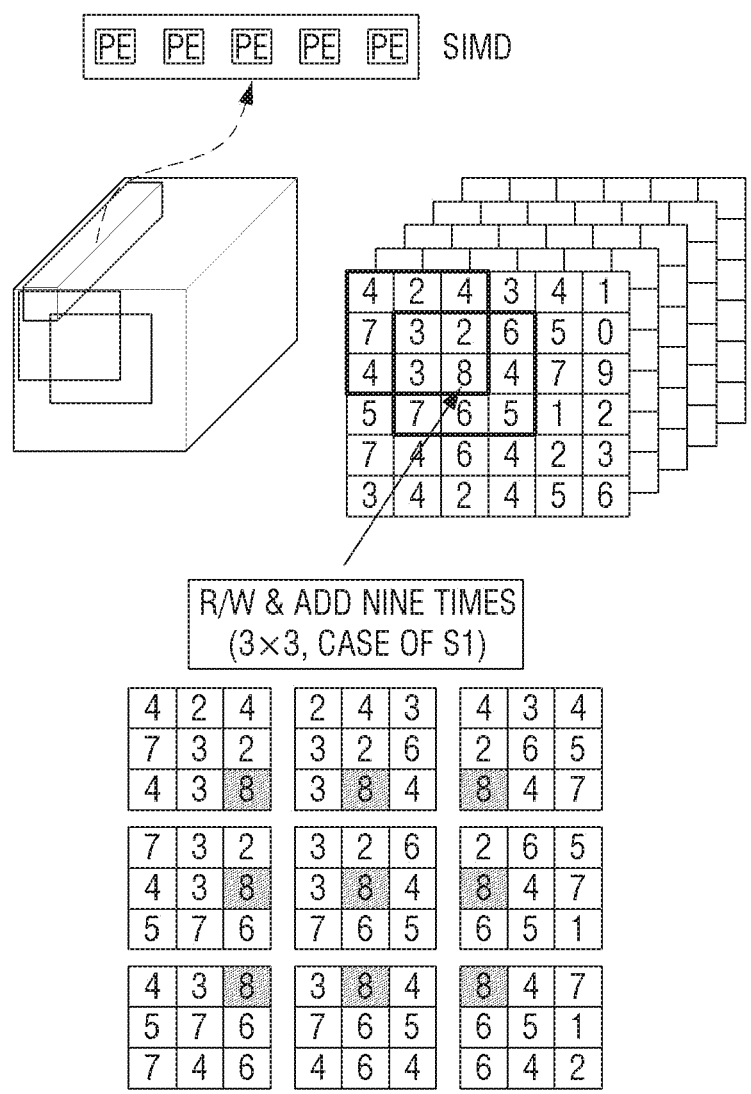
Figure 1F:
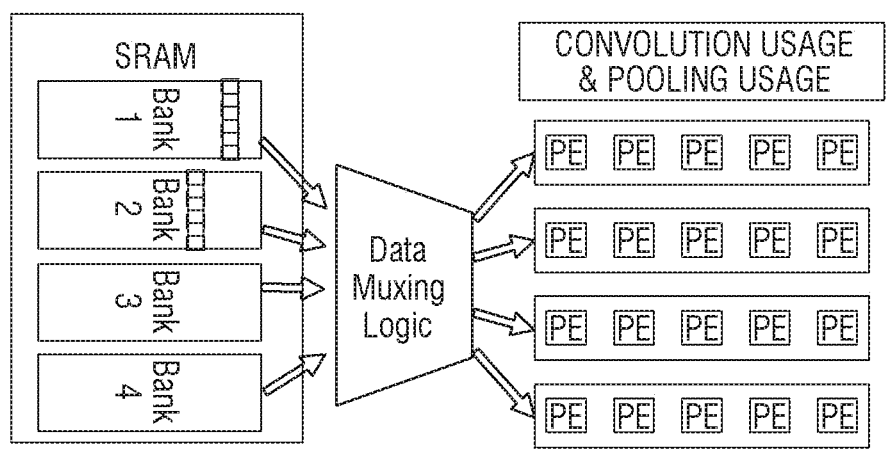

Referring to FIG. 1E, meanwhile, the processor 100 may perform pooling for each of the plurality of local regions based on a stride indicating an overlap degree of the local region. For convenience of description, referring to the drawings of FIG. 1E, FIG. 1E illustrates pooling for nine local regions when a stride is 1. When the stride is 2, the processor 100 performs pooling only for four local regions located at a vertex among the nine local regions in FIG. 1E. For example, the stride may be considered as a difference between a current local region and a next local region.

In addition, the processor 100 may also perform convolution.

The plurality of processing elements 110 may be arranged in a matrix form, and one-way shift or two-way shift of data may be performed between adjacent processing elements.

Each of the plurality of processing elements 110 may include an adder, a multiplexer, a register, and the like for performing the pooling. However, the disclosure is not limited thereto, and each of the plurality of processing elements 110 may further include a multiplier and other arithmetic logic units (ALUs) for performing the convolution.

Here, the adder is a circuit that receives a plurality of data and outputs a sum of the received data, and the multiplexer is a circuit that receives the plurality of data and outputs one of the plurality of received data. The register is a high-speed data storage medium that temporarily stores a very small amount of data or intermediate result being processed, and the multiplier is a circuit that receives the plurality of data and outputs a product of the received data.

Each of the plurality of processing elements 110 may be used to perform the pooling under a control of the controller 120. In addition, each of the plurality of processing elements 110 may also be used to perform the convolution under the control of the controller 120.

The controller 120 controls an operation of the processor 100 on the whole.

The controller 120 may process the target data by controlling the plurality of processing elements 110 during a plurality of cycles.

The controller 120 may read a part of the target data from a memory provided outside the processor 100 and input the read data to the plurality of processing elements 110. For example, the controller 120 may input first elements included in a first row among the plurality of elements included in the target data to first processing elements arranged in the first row among the plurality of processing elements 110, respectively. Here, the first elements included in the first row mean data included in one of a plurality of rows of the target data, and the first processing elements arranged in the first row mean processing elements included in one of the plurality of rows of the plurality of processing elements 110. In addition, the number of first elements included in the first row may be equal to the number of columns of the plurality of processing elements 110. For example, when the plurality of processing elements 110 are in the form of a matrix of 5×5, even if the number of elements included in the first row exceeds five, the controller 120 may read only five first elements, and input each of the read first elements to the first processing elements. In addition, the first elements may be data continuous in the first row of the target data. For example, the controller 120 may group the first elements that are a part of the plurality of elements included in the target data, and process the grouped first elements in the same manner. A parallel operation is possible by this operation, and a description thereof will be described below.

In addition, the controller 120 may control the first processing elements so that each of the first processing elements operates data provided from adjacent first processing elements and the input first elements. For example, the controller 120 may control the first processing elements so that each of the first processing elements transmits the first elements input from the memory to the first processing element adjacent to the right side. In addition, the controller 120 may control the first processing elements so that each of the first processing elements operates the first elements input from the first processing element adjacent to the left side and the first elements input from the memory. The controller 120 may perform this process during a plurality of cycles, and in this case, data transmitted by each of the first processing elements may not be the first element, and a description thereof will be described below with reference to the drawings.

The controller 120 may input second elements included in a second row among the plurality of elements to second processing elements arranged in the second row among the plurality of processing elements 110, respectively. This operation is the same as the operation of inputting the first elements to the first processing elements, and therefore a description thereof will be omitted.

A cycle in which the second elements are input to the second processing elements may be at least one of cycles in which each of the first processing elements performs an operation.

The controller 120 may control the second processing elements so that each of the second processing elements operates data provided from adjacent second processing elements and the input second elements. This operation is the same as the operation for each of the first elements to perform the operation, and therefore a description thereof will be omitted.

The controller 120 controls the second processing elements so that each of the second processing elements operates operation data provided from the adjacent first processing elements in the same column among the first processing elements and pre-stored operation data to acquire a pooling result for the target data.

Meanwhile, the controller 120 inputs each of the first elements to the first processing elements in a first cycle, in a second cycle immediately after the first cycle, controls the first processing elements so that each of the first processing elements operates data provided from the adjacent first processing elements and the input first elements, inputs the second elements to the second processing elements, in a third cycle immediately after the second cycle, controls the second processing elements so that each of the second processing elements operates data provided from the adjacent second processing elements and the input second elements, and in a fourth cycle immediately after the third cycle, controls the second processing elements so that each of the second processing elements operates operation data provided from the adjacent first processing elements in the same column among the first processing elements and pre-stored operation data to acquire the pooling result.

Alternatively, the controller 120 inputs each of the first elements to the first processing elements in the first cycle, during a plurality of cycles immediately after the first cycle, controls the first processing elements so that each of the first processing elements operates data provided from the adjacent first processing elements and the input first elements, in the second cycle that is one of the plurality of cycles, inputs each of the second elements to the second processing elements, during the plurality of cycles immediately after the second cycle, controls the second processing elements so that each of the second processing elements operates the data provided from the adjacent second processing elements and the input second elements, in the third cycle having a predetermined interval from the plurality of cycles immediately after the second cycle, controls the second processing elements so that each of the second processing elements operates the operation data provided from the adjacent first processing elements in the same column among the first processing elements and the pre-stored processing data to acquire the pooling result. Here, the number of cycles immediately after the first cycle may be equal to the number of cycles immediately after the second cycle.

In addition, in an initial cycle of the plurality of cycles immediately after the first cycle, the controller 120 may control the first processing elements so that the first processing elements adjacent to each of the first processing elements provide the first elements, and in the initial cycle of the plurality of cycles immediately after the second cycle, control the second processing elements so that the second processing elements adjacent to each of the second processing elements provides the second elements.

In addition, during a cycle after the initial cycle of the plurality of cycles immediately after the first cycle, the controller 120 may control the first processing elements so that the first processing elements adjacent to each of the first processing elements provide the operation data in the immediately previous cycle, and during a cycle after the initial cycle of the plurality of cycles immediately after the second cycle, the controller may control the second processing elements so that the second processing elements adjacent to each of the second processing elements provide the operation data in the immediately previous cycle.

Meanwhile, the controller 120 inputs third elements included in the third row among the plurality of elements included in the target data to third processing elements arranged in the third row of the plurality of processing elements 110, controls the third processing elements so that each of the third processing elements operates data provided from adjacent third processing elements and the input third elements, and controls the third processing elements so that each of the third processing elements operates operation data provided from the adjacent second processing elements in the same column among the second processing elements to acquire the pooling result. Here, the operation data provided from the adjacent second processing elements may be an operation result of the operation data provided from the adjacent first processing elements in the same column as the adjacent second processing elements and the pre-stored operation data of the adjacent second processing elements.

Meanwhile, the controller 120 controls the first processing elements to perform an add operation of each of the first processing elements and data provided from the adjacent first processing elements to the input first elements, controls the second processing elements to perform an add operation of each of the second processing elements and the data provided from the adjacent second processing elements and the input second elements, and controls the second processing elements to perform an add operation of each of the second processing elements and the operation data provided from the adjacent first processing elements in the same column among the first processing elements and the pre-stored operation data to acquire the average pooling result.

Alternatively, the controller 120 controls the first processing elements so that each of the first processing elements performs a comparison operation of the first elements provided from the adjacent first processing elements and the input first elements, controls the second processing elements so that each of the second processing elements performs a comparison operation of the second element provided from the adjacent second processing elements and the input second elements, and control the second processing elements so that each of the second processing elements performs a comparison operation of the first elements provided from the adjacent first processing elements in the same column among the first processing elements and the pre-stored second elements to acquire the max pooling result.

Meanwhile, each of the plurality of processing elements 110 includes a first register and a second register, and the controller 120 may control the first processing elements so that each of the first processing elements operates data provided from first registers or second registers of the adjacent first processing elements and the first elements stored in the first registers of each of the first processing elements and stores the operated data and first elements in the second registers of each of the first processing elements, and control the second processing elements so that each of the second processing elements operates data provided from first registers or second registers of the adjacent second processing elements and the second elements stored in the first registers of each of the second processing elements and stores the operated data and second elements in the second registers of each of the first processing elements.

Here, the controller 120 may control the second processing elements so that each of the second processing elements operates the operation data provided from the first registers of the adjacent first processing elements in the same column among the first processing elements and the operation data stored in the first registers of each of the second processing elements and stores the operated operation data in the second registers of each of the second processing elements.

As described above, the controller 120 may control the plurality of processing elements 110 to acquire the pooling result, and a more specific method will be described with reference to the following drawings, and first, a structure of the processor 100 will be described.

Figure 2B:
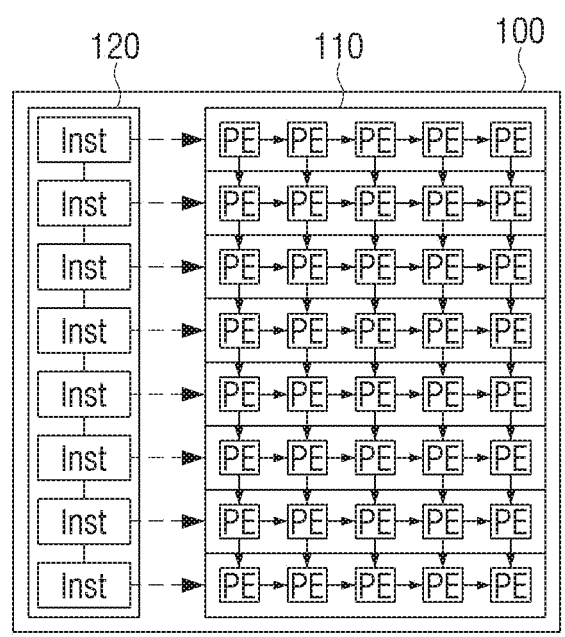
FIG. 2B is a diagram illustrating a configuration of a processor according to an embodiment of the disclosure.

FIG. 2B is a diagram illustrating a configuration of the processor 100 according to an embodiment of the disclosure.

Each of the plurality of processing elements 110 may transmit data to right and lower sides.

Referring to FIG. 2B, each of the plurality of processing elements 110 may receive data from the memory provided outside the processor 100. Alternatively, each of the plurality of processing elements 110 may also receive data from an on-chip memory (for example, cache memory and register) provided inside the processor 100.

However, the disclosure is not limited thereto, and the drawing of FIG. 2B is a diagram for representing a minimum operation for performing the pooling, and the plurality of processing elements 110 may further include a data path for performing the convolution. For example, each of the plurality of processing elements 110 may transmit data to left and the upper sides.

The controller 120 may control the plurality of processing elements 110 by inputting an instruction in a row unit of the plurality of processing elements 110. For example, the controller 120 may control the plurality of processing elements 110 by a single instruction multiple data (SIMD) method of processing the processing elements included in the same row with the same instruction. For example, the controller 120 may control the first processing elements by inputting a first instruction, and control the second processing elements by inputting a second instruction. For example, the controller 120 may control the processing elements included in the same row to perform the same operation.

In addition, the controller 120 may group the first elements included in the same row among the plurality of elements included in the target data, and input each of the grouped first elements to the first processing elements. Then, the controller 120 may control the first processing elements with the first instruction to perform the same operation on the grouped elements. For example, the controller 120 may control the first processing elements in the SIMD method to perform the same operation on the grouped elements in parallel. By this operation, the controller 120 may simultaneously acquire a plurality of pooling results for each of the plurality of local regions.

Here, the controller 120 may determine the number of elements that is to be grouped based on the number of first processing elements. For example, if the number of first processing elements is five, the controller 120 may group five elements included in the same row among the plurality of elements included in the target data. However, the number of first processing elements is not limited thereto, and the controller 120 may determine the number of elements to be grouped to be less than the number of first processing elements.

On the other hand, in the case of the pooling according to the disclosure, the instruction can be rotated. For example, when the controller 120 controls the first processing elements by inputting the first instruction in the first cycle, the controller 120 may control the second processing elements by using the first instruction in the second cycle. A description thereof will be described below.

Figure 2C:
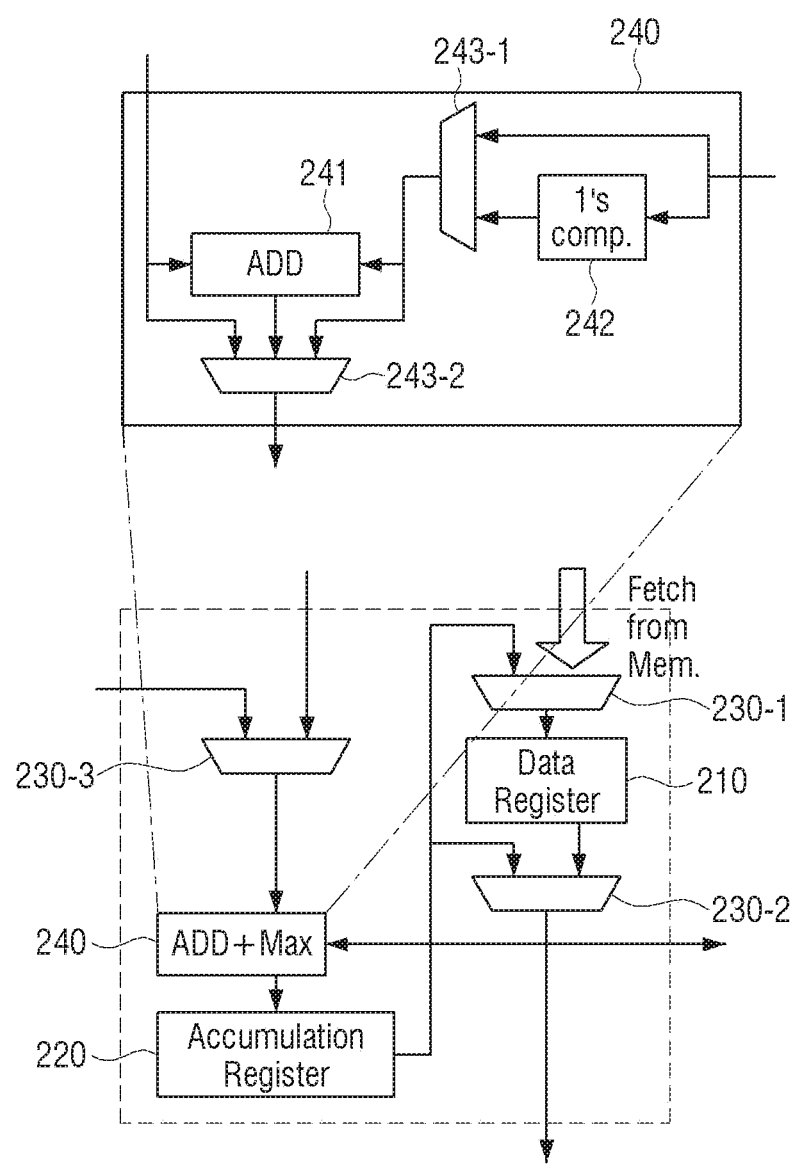
FIGS. 2C and 2D are diagrams illustrating configurations and connection states of each of a plurality of processing elements according to various embodiments of the disclosure.
Figure 2D:
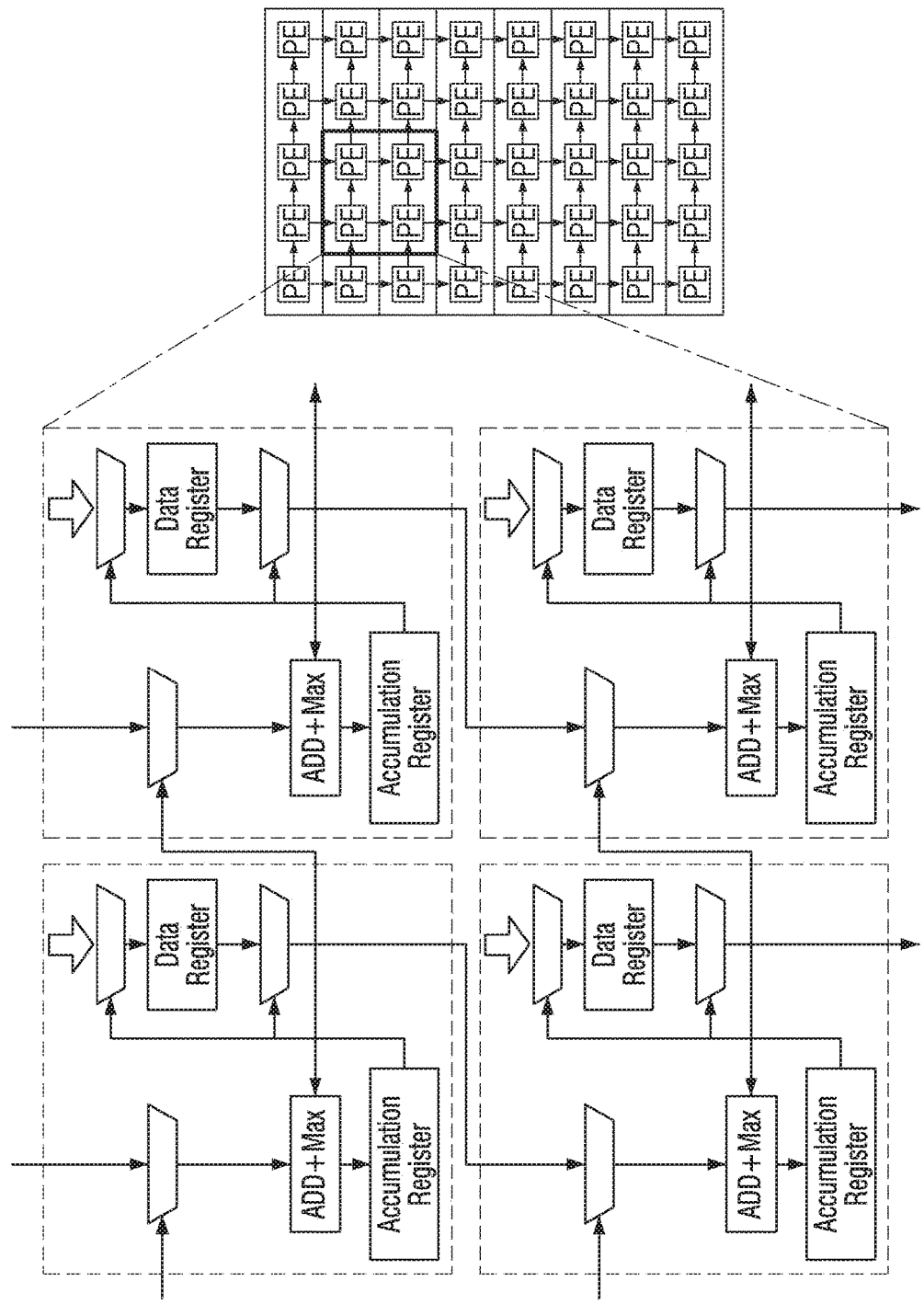

FIGS. 2C and 2D are diagrams illustrating a configuration of each of a plurality of processing elements according to various embodiments of the disclosure.

Referring to FIG. 2D, the plurality of processing elements 110 may all be implemented in the same form, and may be connected.

Referring to FIGS. 2C and 2D, the processing element may include a first register (data register) 210, a second register (accumulation register) 220, a plurality of multiplexers 230-1 to 230-3, and an ADD+Max unit 240. Here, each of the first register 210 and the second register 220 is a high-speed data storage medium that temporarily stores data, and each of the plurality of multiplexers 230-1 to 230-3 may be a circuit that receives a plurality of data and outputs one of the plurality of data. The ADD+Max unit 240 is a circuit that includes an adder (ADD) 241, 1's comps 242, and a plurality of multiplexers 243-1 and 243-2, and operations of elements in the ADD+Max unit 240 may be changed according to a type of pooling, which will be described below.

The first register 210 may receive one of the data input from the memory and the data input from the second register 220 through the multiplexer 230-1.

The multiplexer 230-2 may provide one of data input from the first register 210 and data input from the second register 220 to the ADD+Max unit 240, or provide the data to the processing element on the right side or the processing element on the lower side.

The multiplexer 230-3 may provide one of data provided from the processing element on the left side and data provided from the processing element on the upper side to the ADD+Max unit 240.

The ADD+Max unit 240 may operate data provided from the multiplexer 230-2 and data provided from the multiplexer 230-3 and output the operated data to the second register 220. The operations of the 1's comps 242 and the plurality of multiplexers 243-1 and 243-2 included in the ADD+Max unit 240 may be determined according to whether the processor 100 performs the max pooling or the average pooling.

First, when the max pooling is performed, the larger of the two elements of the target data needs to be identified. In this case, a subtraction operation between the two elements is performed to compare the two elements, and the larger element can be identified according to whether the operation result is a positive number or a negative number. Here, the subtraction operation may be replaced by a 1's complement operation and an add operation.

Therefore, when the max pooling is performed, the multiplexer 243-1 may provide data provided from the 1's comps 242 to the adder 241, and the adder 241 may perform an add operation of data input from the multiplexer 230-3 and data input from the multiplexer 243-1 and provide the added data to the multiplexer 243-2. Here, the 1's comps 242 may be a circuit that performs a 1's complement operation.

The multiplexer 243-2 may output one of the data input from the multiplexer 230-3 and the data input from the multiplexer 243-1 according to whether the data input from the adder 241 is a positive number or a negative number.

Through these operations, the size between the two elements can be compared, and the controller 120 can acquire the max pooling result by controlling the plurality of processing elements 110 to perform this operation over the entire local region.

On the other hand, when the average pooling is performed, the two elements of the target data need to be summed. Accordingly, the multiplexer 243-1 may provide the data input from the multiplexer 230-2 to the adder 241, and the adder 241 may perform an add operation of the data input from the multiplexer 230-3 and the data input from the multiplexer 243-1 and provide the added data to the multiplexer 243-2.

The multiplexer 243-2 may output the data input from the adder 241.

By this operation, the two elements may be summed, and the controller 120 may control the plurality of processing elements 110 to perform this operation over the entire local region, and perform a division operation by the number of elements included in the entire local region to acquire the average polling result.

As described above, the processing element may operate differently according to the type of pooling. In addition, as will be described below, the processing element may operate differently for each cycle.

The controller 120 may control the plurality of multiplexers 230-1 to 230-3, and 243-1, and 243-2 to control the operation of the processing element for each cycle.

Meanwhile, FIG. 2C illustrates the ADD+Max unit 240 capable of performing both the max pooling and the average pooling, but is not limited thereto. For example, when only the average pooling is performed, the processing element may include only the adder instead of the ADD+Max unit 240.

In addition, in FIGS. 2A to 2D, the operation of the controller 120 for acquiring the pooling result has been described, but the controller 120 may control the plurality of processing elements 110 to acquire the convolution result.

FIGS. 3 to 8 are diagrams illustrating an operation of a plurality of processing elements according to various embodiments of the disclosure.

Referring to FIGS. 3 to 8, it is assumed that a size of a region serving as a unit of the pooling is 3×3, and a stride is 1. In addition, for convenience of description, it will be described that the controller 120 performs the add operation according to the average pooling.

Figure 3:
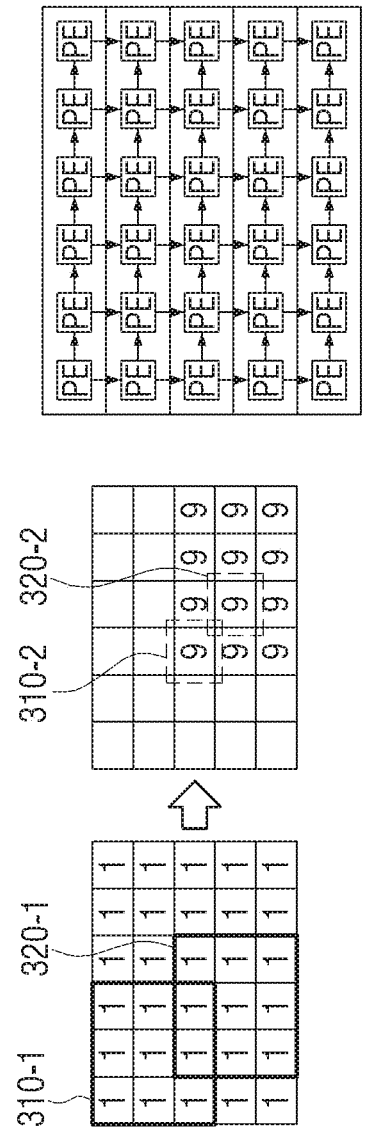

First, as illustrated in FIG. 3, it is assumed that the target data is a 5×6 matrix form, and the plurality of processing elements 110 are arranged in a 5×6 matrix form. However, this is only an example, and the target data may be in various forms, and the number and arrangement of the plurality of processing elements 110 may also be different.

The part indicated by 1 in FIG. 3 represents a state in which the add operation between the elements is not performed, and indicates an initial target data in which the add operation for the pooling is not performed. A part indicated by 9 in FIG. 3 represents a state in which the add operation on nine elements is performed, and represents the pooling result. For example, the pooling may be performed on a 3×3 first local region 310-1 to obtain a first operation data 310-2, and the pooling may be performed on a 3×3 second local region 320-1 to obtain the second operation data 320-2. For example, the number in FIG. 3 means the number of elements used.

Figure 4:
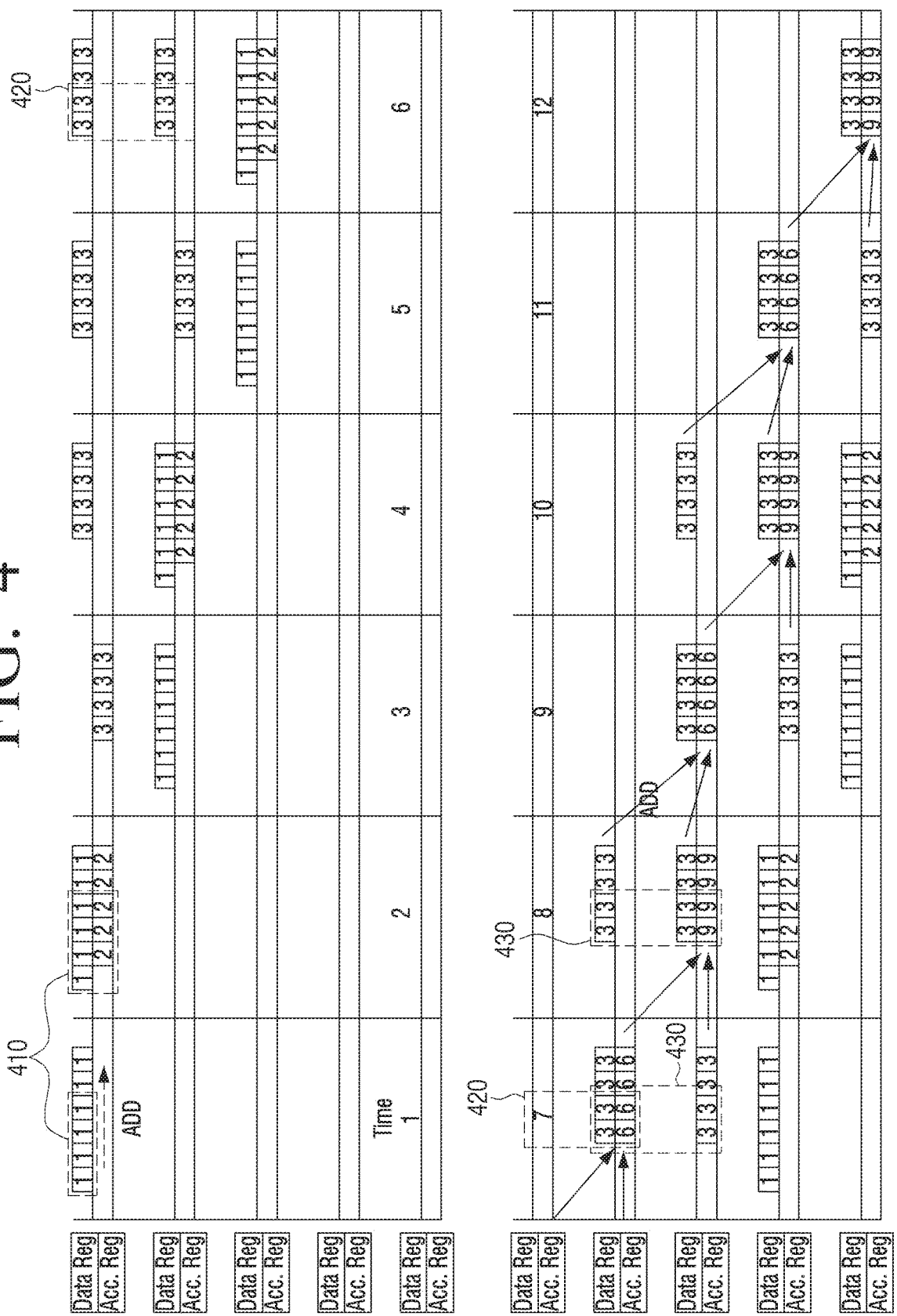

FIG. 4 illustrates the operation of the plurality of processing elements 110 for each cycle (time). First, a first line of FIG. 4 represents data stored in the first register and the second register of the first processing elements included in the first row of the plurality of processing elements 110. For example, the controller 120 may input each of the first elements included in the first row among the plurality of elements included in the target data in Time 1 to the first register of the first processing elements arranged in the first row among the plurality of processing elements 110. In Time 1 of FIG. 4, the first elements are in an input state and are not subjected to the add operation, and therefore are indicated by 1.

In Time 2, the controller 120 may control the first processing elements so that each of the first processing elements is the first processing element adjacent to the right side and provides the first element stored in the first register. In addition, in Time 2, the controller 120 may control the first processing elements so that the first element to which each of the first processing elements is input from the left side and the first element input in Time 1 is subjected to the add operation, and the operation data representing the operation result is stored in the second register. In Time 2 of FIG. 4, the first registers of each of the first processing elements still store the first element input in Time 1 and are represented by 1, and the second registers of each of the first processing elements store the operation data between the two first elements and therefore are represented by 2.

Figure 5:
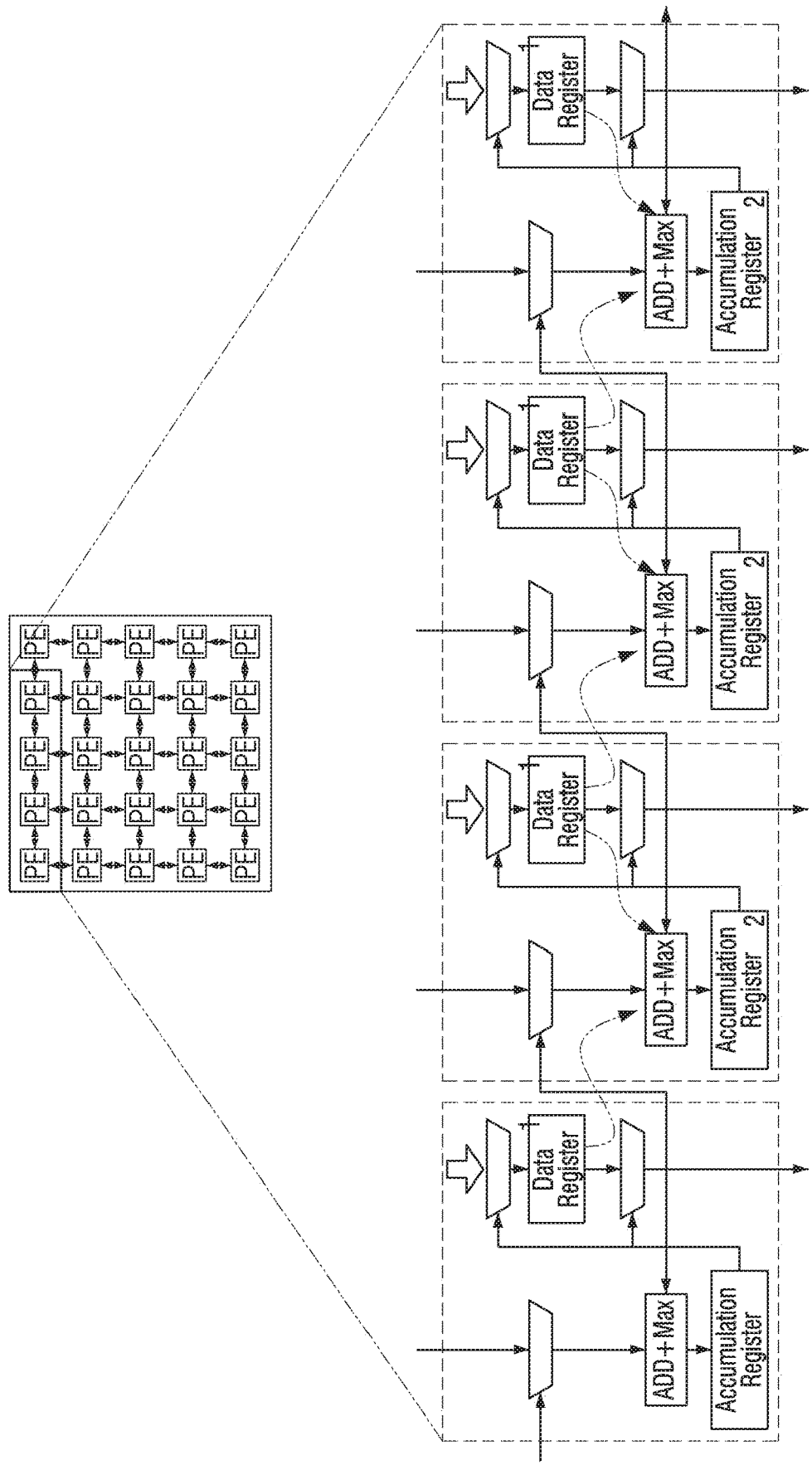

The specific operation 410 of the four first processing elements on the left side is illustrated in FIG. 5. In Time 2, the first processing elements may provide the first element stored in the first register to the ADD+Max unit of the first processing element on the right side. In addition, each of the first processing elements may input the first element stored in the first register to the ADD+Max unit. The ADD+Max units of each of the first processing elements may perform the add operation on the plurality of first elements and store the first elements in the second register.

Referring again to Time 3 of FIG. 4, the controller 120 may control the first processing elements so that each of the first processing elements is the first processing element adjacent to the right side and provides the operation data stored in the second register. In addition, in Time 3, the controller 120 may control the first processing elements to perform an add operation of the operation data to which each of the first processing elements is input from the left side and the first element input in Time 1, store the operation data representing the operation result in the second register, and delete the first register. In Time 3, the operation data stored in the second register may be updated with new operation data. In Time 3 of FIG. 4, the second registers of each of the first processing elements store operation data between three first elements, and therefore are represented by 3.

In addition, the controller 120 may input each of the second elements included in the second row among the plurality of elements included in the target data in Time 3 to the first register of the second processing elements arranged in the second row among the plurality of processing elements 110.

The controller 120 controls the first processing elements to move the operation data stored in the second registers of each of the first processing elements to the first register in Time 4, and does not additionally control the first processing elements until Time 6.

The controller 120 may control the second processing elements from Time 4 to Time 6 in the same manner as the control method of the first processing elements from Time 2 to Time 4.

The controller 120 may input each of the third elements included in the third row among the plurality of elements included in the target data in Time 5 to the first register of the third processing elements arranged in the third row among the plurality of processing elements 110.

The controller 120 may control the third processing elements from Time 6 to Time 7 in the same manner as the control method of the first processing elements from Time 2 to Time 3.

In Time 7, the controller 120 may control the first processing elements so that each of the first processing elements is the second processing element adjacent to the lower side and provides the operation data stored in the first register. In addition, in Time 7, the controller 120 may control the second processing elements to perform an add operation of the operation data to which each of the second processing elements is input from the first processing element and the operation data stored in the first registers of each of the second processing element and store the operation data representing the operation result in the second register. In Time 7 of FIG. 4, the first registers of each of the second processing elements still store the operation data input in Time 6 and therefore are represented by 3, and the second registers of each of the second processing elements store the operation data between six first elements and therefore are represented by 6.

Figure 6:
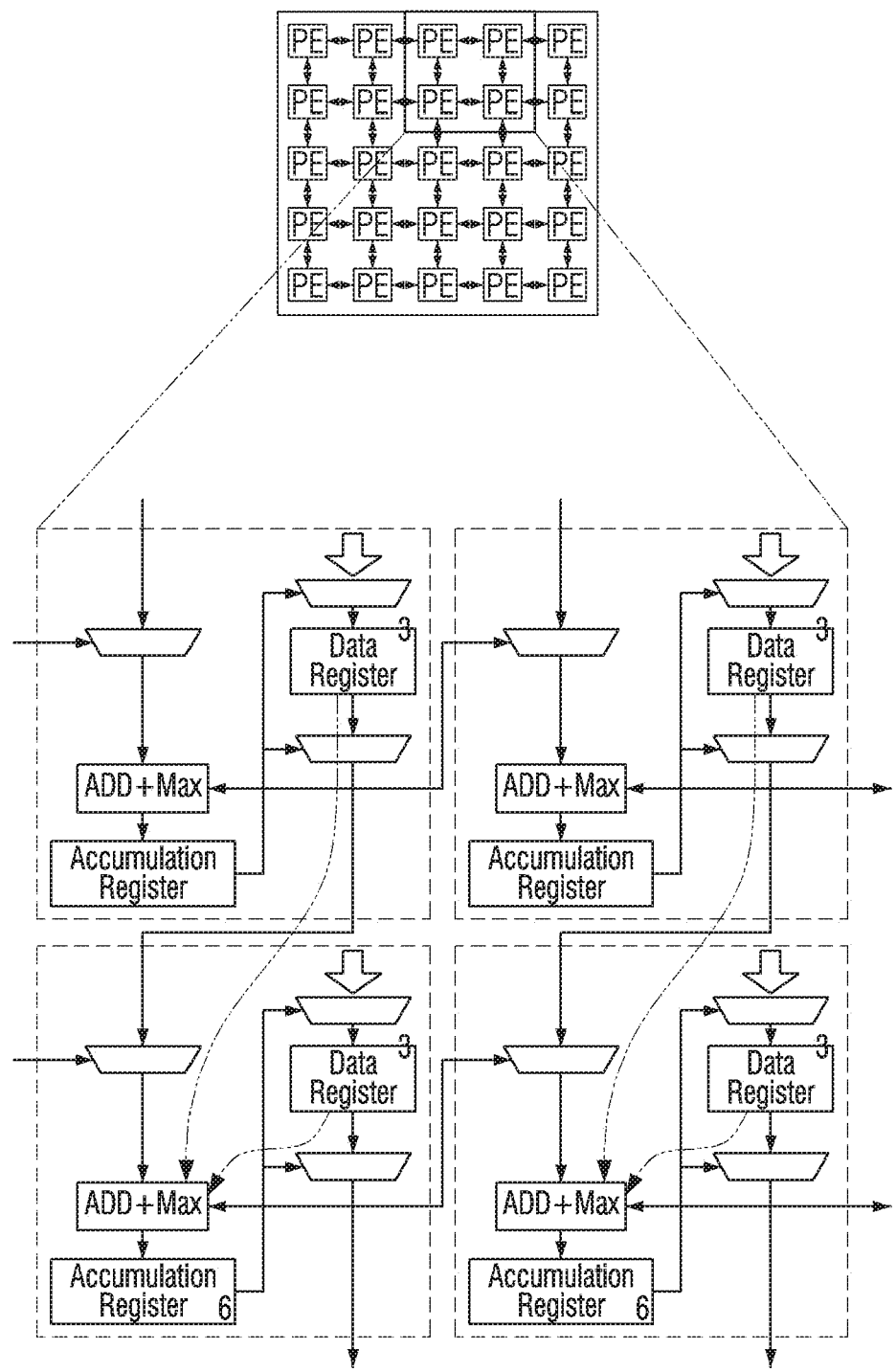

FIG. 6 illustrates a specific operation 420 of two first processing elements and two second processing elements. In Time 7, each of the first processing elements may provide the operation data stored in the first register to the ADD+Max unit of the second processing element on the lower side. In addition, each of the second processing elements may input the operation data stored in the first register to the ADD+Max unit. The ADD+Max units of each of the second processing elements may perform an add operation of the operation data provided from the first processing elements and the operation data provided from the first registers of each of the second processing elements and store the added operation data in the second register.

In addition, the controller 120 may input each of the fourth elements included in the fourth row among the plurality of elements included in the target data in time 7 to the first elements of the fourth processing elements arranged in the fourth row among the plurality of processing elements 110.

In Time 8, the controller 120 may control the second processing elements so that each of the second processing elements is the third processing element adjacent to the lower side and provides the operation data stored in the second register. In addition, in Time 8, the controller 120 may perform an add operation of the operation data to which each of the third processing elements is input from the second processing element and the operation data stored in the second registers of each of the third processing elements, and control the second processing elements to store the operation data representing the operation result in the second register. In addition, the controller 120 may control the third processing elements to move the operation data stored in the second register of each of the third processing elements to the first register in Time 8. In Time 8 of FIG. 4, the first registers of each of the third processing elements store the operation data input in Time 8 and therefore are represented by 3, and the second registers of each of the third processing elements store the operation data between nine first elements and therefore are represented by 9.

Figure 7:
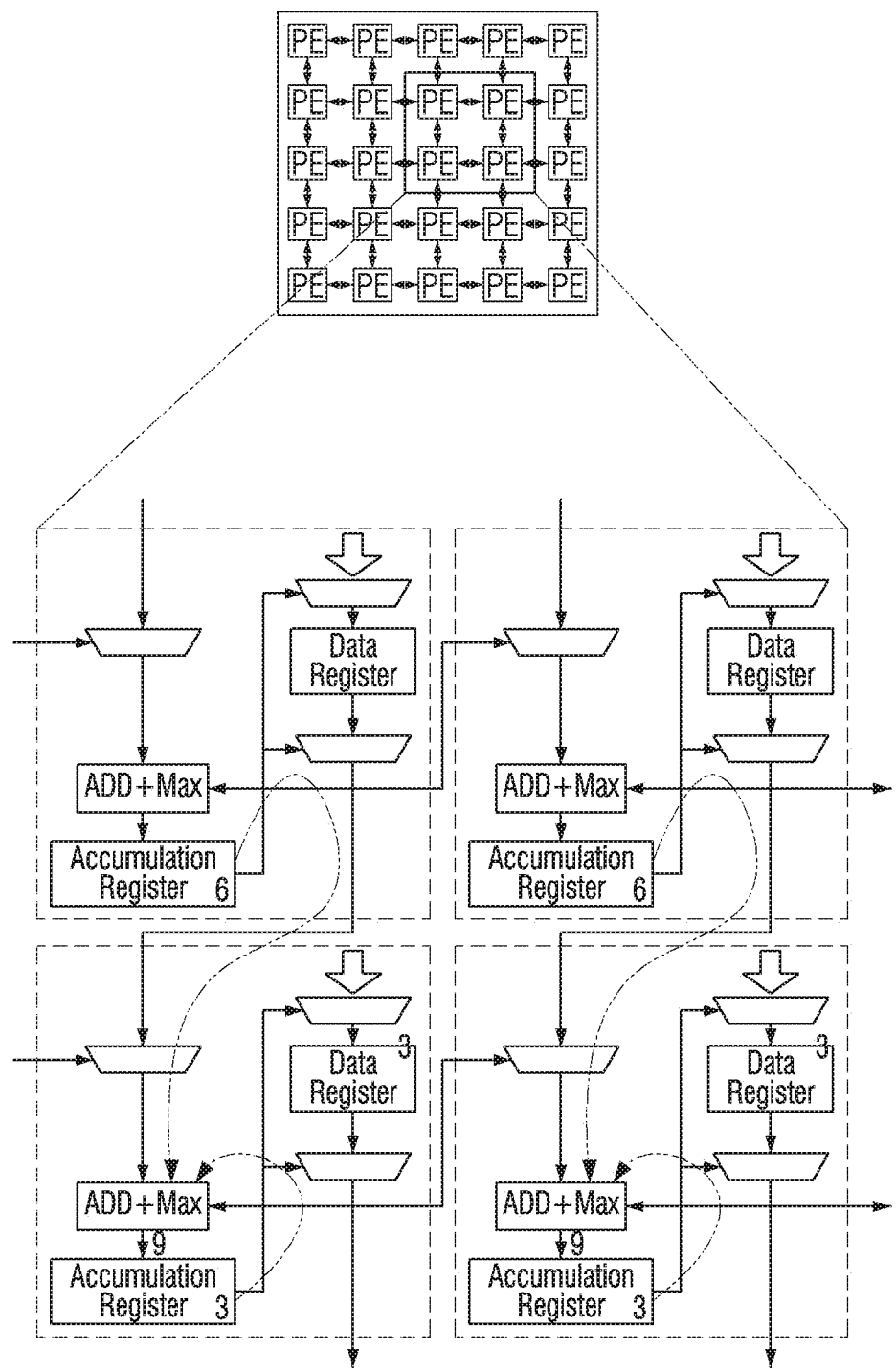
Figure 9A:
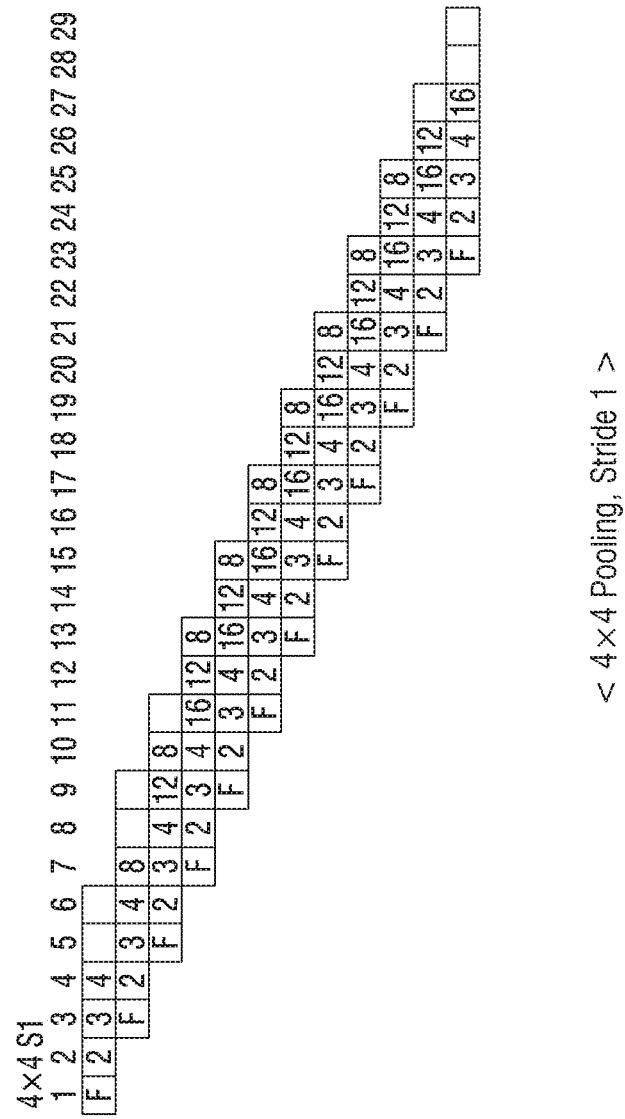
Figure 10C:
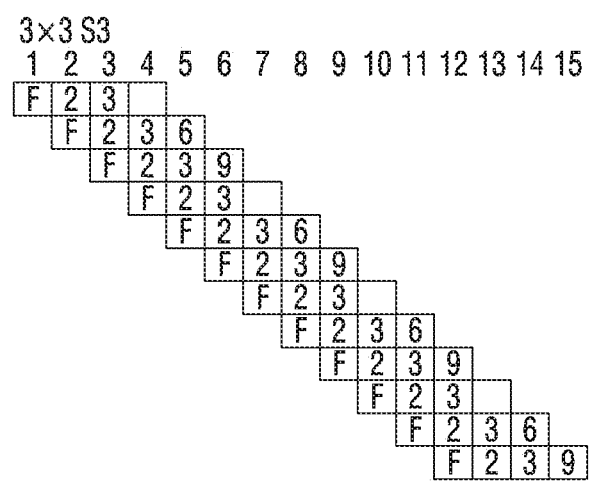

FIG. 7 illustrates a specific operation 430 of two second processing elements and two third processing elements. In Time 8, each of the second processing elements may provide the operation data stored in the second register to the ADD+Max unit of the third processing element on the lower side. In addition, each of the third processing elements may input the operation data stored in the second register to the ADD+Max unit. The ADD+Max units of each of the third processing elements may perform an add operation of the operation data provided from the second processing elements and the operation data provided from the second registers of each of the third processing elements and store the added operation data in the second register.

The controller 120 may read the operation data stored in the second register of the third processing elements as the pooling result. According to Time 8 of FIG. 4, there are four pooling results, which means that parallel operation is performed as the pooling result for four local regions. For example, as the number of columns of the plurality of processing elements 110 increases, the parallel processing capability may be improved.

The controller 120 may control the third processing elements from Time 9 to Time 10 by the control method of the second processing elements from Time 7 to Time 8, and control the fourth processing elements from Time 9 to Time 10 by the third control method from Time 7 to Time 8.

For example, the controller 120 may acquire the pooling result by repeatedly applying the control method as described above. More particularly, as the processing element stores the operation result between the elements in the row direction and provides the stored operation result to the processing element on the lower side, the redundant operation issue of the related art can be addressed.

In addition, unlike the related art, because the plurality of processing elements 110 receive the plurality of elements included in the target data only once, it is possible to address the redundant input issue of data.

Meanwhile, the operation result for each cycle of the controller 120 are briefly illustrated in FIG. 8. For convenience of description, the operation result is illustrated in the form in which the parallel processing is omitted as the plurality of processing elements 110 include a plurality of columns of processing elements. A horizontal axis of FIG. 8 represents Time, and a vertical axis represents rows of the plurality of processing elements 110. In FIG. 8, F denotes a point in time when a part of the target data is input to the plurality of processing elements 110, and a number denotes the number of elements used.

For example, the pooling result is acquired for the first time in Time 8, and then an additional pooling result is obtained at intervals of two cycles. This is because the processing element stores the operation result between the elements in the row direction.

In addition, a part of the target data is input at two cycle intervals to keep a memory bandwidth uniform and lowering a peak bandwidth.

FIGS. 9A to 11C are diagrams illustrating a method of operating a controller for each cycle according to various embodiments of the disclosure.

Figure 10D:
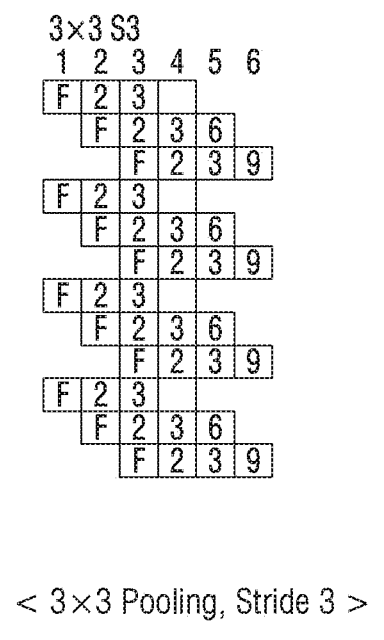
Figure 11A:
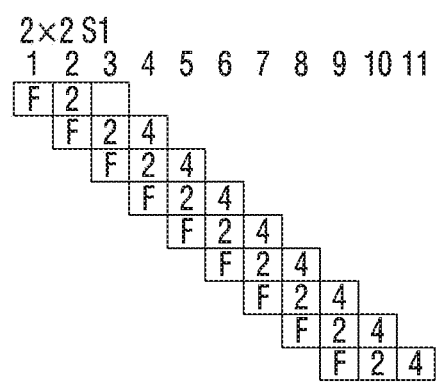
Figure 11B:
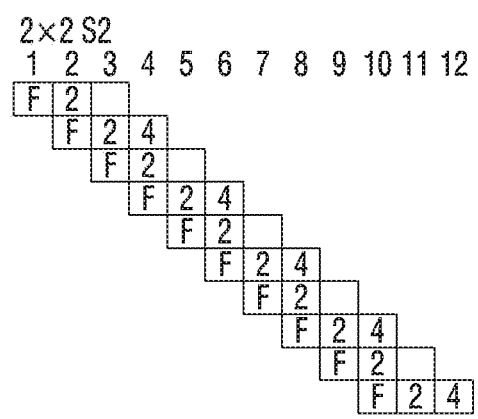
Figure 11C:
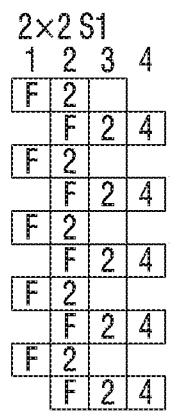

Referring to FIGS. 3 to 8, it is assumed that the size of the region serving as the unit of the pooling is 3×3, and the stride is 1, but as illustrated in FIGS. 9A to 9E, the size of the region serving as the unit of the pooling may be 4×4, as illustrated in FIGS. 10A to 10D, the size of the region serving as the unit of the pooling may be 3×3, or as illustrated in FIGS. 11A to 11C, the size of the region serving as the unit of the pooling may be 2×2.

In addition, if one side of the size of the region serving as the unit of the pooling is the same as the stride, because the operation result between the elements in the row direction need not be periodically used, the operations, such as FIGS. 9E, 10D, and 11C are possible.

Referring to FIGS. 9A to 11C, the operation method of FIGS. 9A to 11C may be stored in the memory provided outside the processor 100. When a pooling command is input, the controller 120 may perform the pooling by reading an operation method corresponding to a pooling condition (for example, the size of the region serving as the unit of the pooling and the stride) from the memory.

However, the disclosure is not limited thereto, and the processor 100 further includes an internal memory (for example, cache memory and register) in which the operation method as illustrated in FIGS. 9A to 11C is stored, and when the pooling command is input, the controller 120 may perform the pooling by reading the operation method corresponding to the pooling condition from the internal memory.

Figure 12:
FIG. 12 is a diagram illustrating a method of increasing utilization of a plurality of processing elements according to an embodiment of the disclosure.

FIG. 12 is a diagram illustrating a method of increasing utilization of a plurality of processing elements according to an embodiment of the disclosure.

Referring to FIG. 12, the upper side of FIG. 12 illustrates an operation method of the controller 120 when the size of the region serving as the unit of the pooling is 3×3 and the stride is 2. In this case, the processing element included in the first row provides the operation data to the second row in Time 5, and then does not perform an additional operation.

Therefore, as illustrated in the lower side of FIG. 12, the controller 120 may perform the pooling by inputting an additional element included in the target data to the processing element included in the first row in Time 5. Because the processing element includes the first register and the second register, no problem occurs even if the additional element is input in Time 5.

Figure 13:
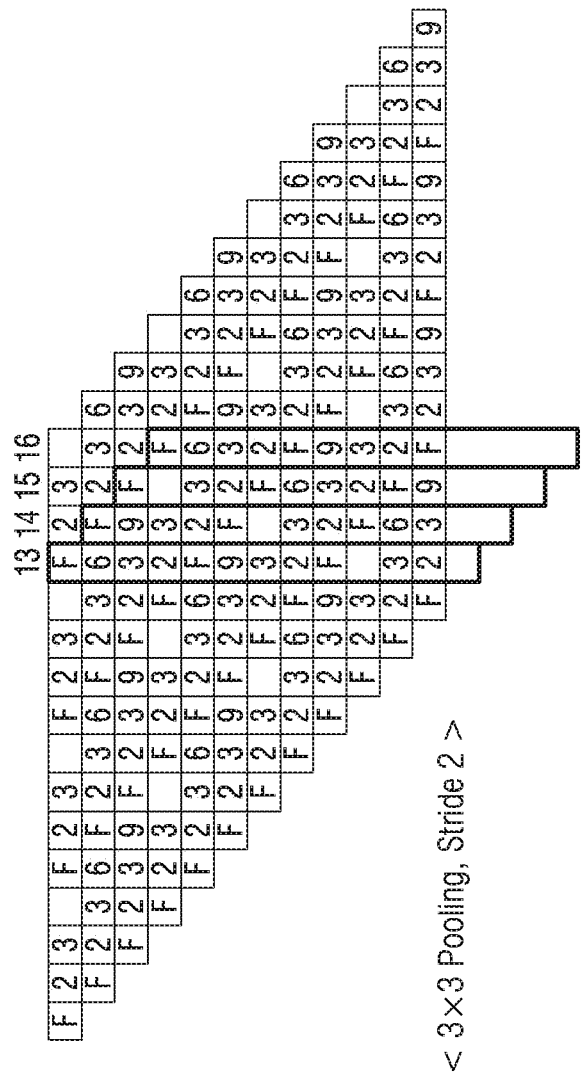
FIG. 13 is a diagram illustrating a rotation of an instruction according to an embodiment of the disclosure.

FIG. 13 is a diagram illustrating a rotation of an instruction according to an embodiment of the disclosure.

Referring to FIG. 13, the controller 120 may input instructions from the first processing elements included in the first row to thirteenth processing elements included in a thirteenth row in Time 13. At this time, because the input instructions are different in units of rows, a total of 13 instructions can be input.

In addition, the controller 120 may input the instructions input in Time 13 from the second processing elements included in the second row to fourteenth processing elements included in a fourteenth row in Time 14.

For example, the controller 120 may rotate a plurality of instructions to control the plurality of processing elements 110. For example, one instruction may be input to the first processing elements included in the first row and then sequentially input to processing elements included in a lower row, and may be input to the processing elements included in a last row and then input to the first processing elements again. Accordingly, as illustrated in FIG. 2B, the controller 120 may be implemented in a form of inputting a plurality of instructions in units of rows of the plurality of processing elements 110.

Figure 14:
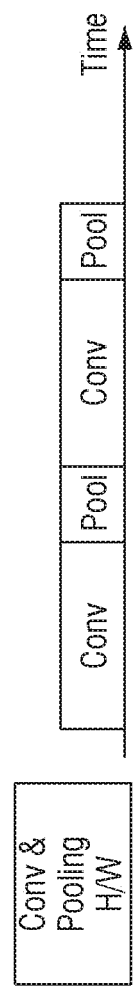
FIG. 14 is a diagram illustrating an effect according to an embodiment of the disclosure.

FIG. 14 is a diagram illustrating an effect according to an embodiment of the disclosure.

As described above, the processor 100 may perform the pooling. In addition, because each of the plurality of processing elements 110 further includes a configuration for performing the convolution, the processor 100 may perform the convolution.

Referring to FIG. 14, the plurality of processing elements 110 maintain a state in which the pooling or convolution is performed, and as a result, a load-balancing issue can be addressed.

Figure 15:
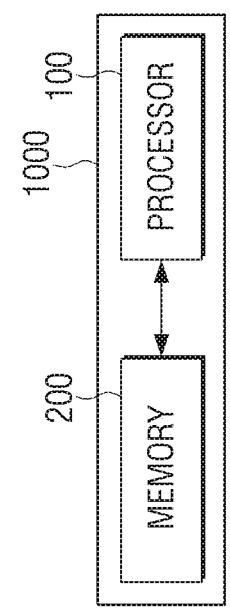
FIG. 15 is a diagram illustrating an electronic device using a processor according to an embodiment of the disclosure.

FIG. 15 is a view illustrating an electronic device using a processor according to an embodiment of the disclosure.

Referring to FIG. 15, the electronic device 1000 may include a processor 100 and a memory 200.

The electronic device 1000 is a device that learns an artificial intelligence algorithm or performs an operation according to an artificial intelligence model, and may be a device, such as a computer, a laptop, a server, a tablet, or a smartphone. However, the disclosure is not limited thereto, and the electronic device 1000 may be any device as long as it can learn the artificial intelligence algorithm or perform an operation according to the artificial intelligence model.

In the process of the electronic device 1000 to learn the artificial intelligence algorithm or perform an operation according to the artificial intelligence model, the processor 100 may perform the convolution or pooling. More particularly, the processor 100 may perform the convolution or pooling using the plurality of processing elements 110 of a two-dimensional calculator structure (2D Array). For example, the processor 100 may perform the convolution using the plurality of processing elements 110 for a first time period, and perform the pooling using the plurality of processing elements 110 for the second time period after the first time period.

When the electronic device 1000 learns the artificial intelligence algorithm, the processor 100 may perform the convolution or pooling according to the artificial intelligence algorithm stored in the memory 200 and update the artificial intelligence model which is being learned.

When the electronic device 1000 performs the operation according to the artificial intelligence model, the processor 100 may read the artificial intelligence model stored in the memory 200 and apply input data to the artificial intelligence model to acquire output data. The processor 100 may perform the convolution or pooling in the process of applying the input data to the artificial intelligence model.

Figure 16:
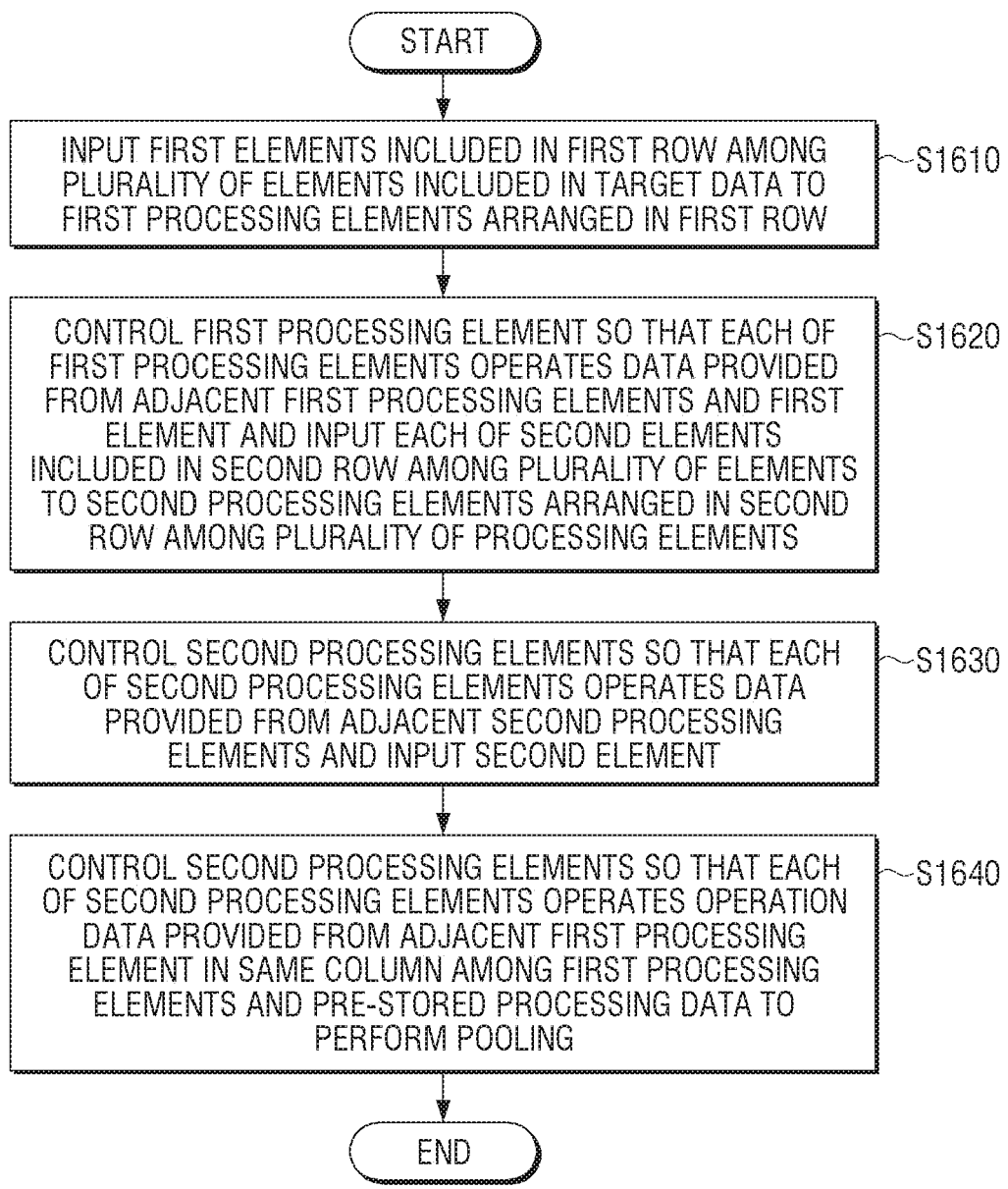
FIG. 16 is a flowchart illustrating a control method of a processor according to an embodiment of the disclosure.

FIG. 16 is a flowchart illustrating a control method of a processor according to an embodiment of the disclosure.

Referring to FIG. 16, in a control method of a processor that includes a plurality of processing elements arranged in a matrix form and performs pooling on target data using the plurality of processing elements during a plurality of cycles, first, each of the first elements included in a first row among the plurality of elements included in the target data is input to the first processing elements arranged in the first row among the plurality of processing elements at the operation S1610. Then, the first processing elements are controlled so that each of the first processing elements operates data provided from adjacent first processing elements and the input first element, and each of the second elements included in a second row among the plurality of elements is input to the second processing elements arranged in the second row among the plurality of processing elements at the operation S1620. Then, the second processing elements are controlled so that each of the second processing elements operates data provided from adjacent second processing elements and the input second element S1630. Then, the second processing elements are controlled so that each of the second processing elements operates operation data provided from the adjacent first processing elements in the same column among the first processing elements and pre-stored operation data to perform the pooling S1640.

Here, at the operation S1610 of inputting to the first processing elements, in the first cycle, each of the first elements is input to the first processing elements, at the operation S1620 of inputting to the second processing elements, in a second cycle immediately after the first cycle, the first processing elements are controlled so that each of the first processing operates data provided from the adjacent first processing elements and the input first elements, at the operation S1630 of controlling the second processing elements, in a third cycle immediately after the second cycle, the second processing elements are controlled so that each of the second processing elements inputs operates the data provided from the adjacent second processing elements and the input second elements, and at operation S1640 of performing the pooling, in a fourth cycle immediately after the third cycle, the second processing elements are controlled so that each of the second processing elements operates the operation data provided from the adjacent first processing elements in the same column among the first processing elements and the pre-stored processing data to perform the pooling.

Alternatively, at the operation S1610 of inputting to the first processing elements, in the first cycle, each of the first elements is input to the first processing elements, at the operation S1620 of inputting to the second processing elements, during a plurality of cycles immediately after the first cycle, the first processing elements are controlled so that each of the first processing elements operates data provided from the adjacent first processing elements and the input first elements, at the operation S1630 of controlling the second processing elements, during the plurality of cycles immediately after the second cycle, the second processing elements are controlled so that each of the second processing elements operates the data provided from the adjacent second processing elements and the input second elements, and at the operation S1640 of performing the pooling, in the third cycle having a predetermined interval from the plurality of cycles immediately after the second cycle, the second processing elements are controlled so that each of the second processing elements operates the operation data provided from the adjacent first processing elements in the same column among the first processing elements and the pre-stored processing data to perform the pooling. Here, the number of cycles immediately after the first cycle may be equal to the number of cycles immediately after the second cycle.

In addition, in the step of controlling the first processing elements, in the initial cycle of the plurality of cycles immediately after the first cycle, the first processing elements may be controlled so that the first processing elements adjacent to each of the first processing elements provide the first elements, and at the operation S1630 of controlling the second processing elements, in the initial cycle of the plurality of cycles immediately after the second cycle, the second processing elements may be controlled so that the second processing elements adjacent to each of the second processing elements provides the second elements.

Here, in the step of controlling the first processing elements, during a cycle after the initial cycle of the plurality of cycles immediately after the first cycle, the first processing elements may be controlled so that the first processing elements adjacent to each of the first processing elements provide the operation data in the immediately previous cycle, and at the operation S1630 of controlling the second processing elements, during a cycle after the initial cycle of the plurality of cycles immediately after the second cycle, the second processing elements may be controlled so that the second processing elements adjacent to each of the second processing elements provide the operation data in the immediately previous cycle.

Meanwhile, the control method further includes a step of inputting third elements included in the third row among the plurality of elements included in the target data to third processing elements arranged in the third row of the plurality of processing elements 110 and controlling the third processing elements so that each of the third processing elements operates data provided from adjacent third processing elements and the input third elements, and at the operation S1640 of performing the pooling, the third processing elements are controlled so that each of the third processing elements operates operation data provided from the adjacent second processing elements in the same column among the second processing elements to perform the pooling. Here, the operation data provided from the adjacent second processing elements may be an operation result of the operation data provided from the adjacent first processing elements in the same column as the adjacent second processing elements and the pre-stored operation data of the adjacent second processing elements.

Then, in the step of controlling the first processing elements, the first processing elements are controlled so that each of the first processing elements performs an add operation of data provided from the adjacent first processing elements and the input first elements, at the operation S1620 of controlling the second processing elements, the second processing elements are controlled so that each of the second processing elements performs an add operation of the data provided from the adjacent second processing elements and the input second elements, and at the operation S1640 of controlling the pooling, the second processing elements are controlled so that each of the second processing elements performs an add operation of the operation data provided from the adjacent first processing elements in the same column among the first processing elements and the pre-stored operation data to perform the average pooling.

Alternatively, in the step of controlling the first processing elements, the first processing elements are controlled so that each of the first processing elements performs a comparison operation of the first elements provided from the adjacent first processing elements and the input first elements, at the operation S1630 of controlling the second processing elements, the second processing elements are controlled so that each of the second processing elements performs a comparison operation of the second element provided from the adjacent second processing elements and the input second elements, and at the operation S1640 of performing the pooling, the second processing elements are controlled so that each of the second processing elements performs a comparison operation of the first elements provided from the adjacent first processing elements in the same column among the first processing elements and the pre-stored second elements to perform the max pooling.

Meanwhile, each of the plurality of processing elements 110 includes a first register and a second register, and in the step of controlling the first processing elements, the first processing elements may be controlled so that each of the first processing elements operates data provided from first registers or second registers of the adjacent first processing elements and the first elements stored in the first registers of each of the first processing elements and stores the operated data and first elements in the second registers of each of the first processing elements, and at the operation S1630 of controlling the second processing elements, the second processing elements may be controlled so that each of the second processing elements operates data provided from first registers or second registers of the adjacent second processing elements and the second elements stored in the first registers of each of the second processing elements and stores the operated data and second elements in the second registers of each of the first processing elements.

Here, at the operation S1640 of performing the pooling, the second processing elements may be controlled so that each of the second processing elements operates the operation data provided from the first registers of the adjacent first processing elements in the same column among the first processing elements and the operation data stored in the first registers of each of the second processing elements and stores the operated operation data in the second registers of each of the second processing elements.

According to various embodiments of the disclosure as described above, the processor may perform the pooling as well as the convolution by using a plurality of processing elements having a 2D array structure to address the hardware dualization issue, the load-balancing problem, and the redundant operation problems and lower the peak bandwidth.

Meanwhile, according to an embodiment of the disclosure, the various embodiments described above may be implemented by software including instructions stored in a machine-readable storage medium (for example, a computer-readable storage medium). A machine may be an apparatus that invokes the stored instruction from the storage medium and may be operated depending on the invoked instruction, and may include the electronic apparatus (for example, the electronic apparatus A) according to the disclosed embodiments. In the case in which a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

In addition, according to an embodiment of the disclosure, the methods according to the diverse embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least portions of the computer program product may be at least temporarily stored in a storage medium, such as a memory of a server of a manufacturer, a server of an application store, or a relay server or be temporarily created.

In addition, according to an embodiment of the disclosure, the diverse embodiments described above may be implemented in a computer or a computer-readable recording medium using software, hardware, or a combination of software and hardware. In some cases, embodiments described in the disclosure may be implemented by the processor itself. According to a software implementation, embodiments, such as procedures and functions described in the disclosure may be implemented by separate software modules. Each of the software modules may perform one or more functions and operations described in the disclosure.

Meanwhile, computer instructions for performing processing operations of the machines according to the diverse embodiment of the disclosure described above may be stored in a non-transitory computer-readable medium. The computer instructions stored in the non-transitory computer-readable medium allow a specific machine to perform the processing operations in the machine according to the diverse embodiments described above when they are executed by a processor of the specific machine. The non-transitory computer-readable medium is not a medium that stores data for a while, such as a register, a cache, a memory, or the like, but means a medium that semi-permanently stores data and is readable by the apparatus. A specific example of the non-transitory computer-readable medium may include a compact disk (CD), a digital versatile disk (DVD), a hard disk, a Blu-ray disk, a universal serial bus (USB), a memory card, a read only memory (ROM), or the like.

In addition, each of components (for example, modules or programs) according to the diverse embodiments described above may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

While the disclosure has been shown and described with reference to various embodiments thereof, but it will be understood by those skilled in the art to that various changes in form and details may be made therein without departing from the scope and spirit of the disclosure as defined by the appended claims and their equivalents.

What is claimed is:

1. A processor comprising:
   a plurality of processing elements configured to be arranged in a matrix form; and
   a controller configured to control the plurality of processing elements during a plurality of cycles to process a target data,
   wherein the controller is further configured to:
   input each of first elements included in a first row among a plurality of elements included in the target data to first processing elements arranged in the first row among the plurality of processing elements in a first cycle,
   control the first processing elements so that each of the first processing elements operates on data provided from adjacent first processing elements and the input first elements during a plurality of cycles immediately after the first cycle,
   inputs each of second elements included in a second row among the plurality of elements to second processing elements arranged in the second row among the plurality of processing elements in a second cycle that is one of the plurality of cycles,
   control the second processing elements so that each of the second processing elements operates on data provided from adjacent second processing elements and the input second elements during a plurality of cycles immediately after the second cycle, and
   control the second processing elements so that each of the second processing elements operates on operation data provided from the adjacent first processing elements in the same column among the first processing elements and pre-stored operation data in a third cycle having a predetermined interval from the plurality of cycles immediately after the second cycle to acquire a pooling result for the target data, and
   wherein a number of cycles immediately after the first cycle is equal to a number of cycles immediately after the second cycle.

2. The processor of claim 1, wherein the controller is further configured to:
   control the first processing elements so that first processing elements adjacent to each of the first processing elements provide the first elements in an initial cycle of the plurality of cycles immediately after the first cycle, and
   control the second processing elements so that second processing elements adjacent to each of the first processing elements provide the second elements in the initial cycle of the plurality of cycles immediately after the second cycle.

3. The processor of claim 2, wherein the controller is further configured to:
- control the first processing elements so that first processing elements adjacent to each of the first processing elements provide operation data in an immediately previous cycle, during a cycle after the initial cycle of the plurality of cycles immediately after the first cycle, and
- control the second processing elements so that second processing elements adjacent to each of the second processing elements provide operation data in the immediately previous cycle, during the cycle immediately after the initial cycle of the plurality of cycles immediately after the second cycle.

4. The processor of claim 1, wherein the controller is further configured to:
- input each of third elements included in a third row among the plurality of elements included in the target data to third processing elements arranged in the third row among the plurality of processing elements,
- control the third processing elements so that each of the third processing elements operates on data provided from adjacent third processing elements and the input third element, and
- control the third processing elements so that each of the third processing elements controls the third processing elements to operate operation data provided from adjacent second processing elements in the same column among the second processing elements and the pre-stored operation data to acquire the pooling result, and the operation data provided from the adjacent second processing elements is an operation result of the operation data provided from the adjacent first processing elements in the same column as the adjacent second processing elements and the pre-stored operation data of the adjacent second processing elements.

5. The processor of claim 1, wherein the controller is further configured to:
- control the first processing elements so that each of the first processing elements performs an add operation of the data provided from the adjacent first processing elements and the input second elements,
- control the second processing elements so that each of the second processing elements performs an add operation of the data provided from the adjacent second processing elements and the input second elements, and
- control the second processing elements so that each of the second processing elements performs an add operation of the operation data provided from the adjacent first processing elements in the same column among the first processing elements and the pre-stored operation data to acquire an average pooling result.

6. The processor of claim 1, wherein the controller is further configured to:
- control the first processing elements so that each of the first processing elements performs a comparison operation of the first element provided from the adjacent first processing elements and the input first elements,
- control the second processing elements so that each of the second processing elements performs a comparison operation of the second element provided from the adjacent second processing elements and the input second elements, and
- control the second processing elements so that each of the second processing elements performs a comparison operation of the first element provided from the adjacent first processing elements in the same column among the first processing elements and pre-stored second element to acquire a max pooling result.

7. The processor of claim 1,
wherein each of the plurality of processing elements includes:
- a first register; and
- a second register, and wherein the controller is further configured to:
- control the first processing elements so that each of the first processing elements operates on data provided from the first registers or the second registers of the adjacent first processing elements and first elements stored in the first registers of each of the first processing elements and stores the operated data and first elements in the second registers of each of the first processing elements, and
- control the second processing elements so that each of the second processing elements operates on data provided from the first registers or the second registers of the adjacent second processing elements and second elements stored in the first registers of each of the second processing elements and stores the operated data and second elements in the second registers of each of the second processing elements.

8. The processor of claim 7, wherein the controller is further configured to control the second processing elements so that each of the second processing elements operates on the operation data provided from the first registers of the adjacent first processing elements in the same column among the first processing elements and the operation data stored in the first registers of each of the second processing elements and stores the operated operation data in the second registers of each of the second processing elements.

9. The processor of claim 1, wherein each of the plurality of processing elements includes at least one of an adder, a multiplexer, or a register for performing the pooling.

10. A method of controlling a processor that includes a plurality of processing elements arranged in a matrix form and performs pooling on target data using the plurality of processing elements during a plurality of cycles, the method comprising:
- inputting each of first elements included in a first row among a plurality of elements included in the target data to first processing elements arranged in the first row among the plurality of processing elements in a first cycle;
- controlling the first processing elements so that each of the first processing elements operates on data provided from adjacent first processing elements and the input first elements during a plurality of cycles immediately after the first cycle,
- inputting each of second elements included in a second row among the plurality of elements to second processing elements arranged in the second row among the plurality of processing elements in a second cycle that is one of the plurality of cycles;
- controlling the second processing elements so that each of the second processing elements operates on data provided from adjacent second processing elements and the input second elements during a plurality of cycles immediately after the second cycle; and
- controlling the second processing elements so that each of the second processing elements operates on operation data provided from the adjacent first processing elements in the same column among the first processing elements and pre-stored operation data in a third cycle having a predetermined interval from the plurality of cycles immediately after the second cycle to perform the pooling, wherein a number of cycles immediately after the first cycle is equal to a number of cycles immediately after the second cycle.

11. The method of claim 10, wherein, in the controlling of the first processing elements, the first processing elements are controlled so that first processing elements adjacent to each of the first processing elements provide the first elements in an initial cycle of the plurality of cycles immediately after the first cycle, and wherein, in the controlling of the second processing elements, the second processing elements are controlled so that second processing elements adjacent to each of the first processing elements provide the second elements in the initial cycle of the plurality of cycles immediately after the second cycle.

12. The method of claim 11, wherein, in the controlling of the first processing elements, the first processing elements are controlled so that first processing elements adjacent to each of the first processing elements provide the operation data in an immediately previous cycle, during a cycle after the initial cycle of the plurality of cycles immediately after the first cycle, and wherein, in the controlling of the second processing elements, the second processing elements are controlled so that second processing elements adjacent to each of the second processing elements provide operation data in the immediately previous cycle, during the cycle after the initial cycle of the plurality of cycles immediately after the second cycle.

13. The method of claim 10, further comprising:

inputting each of third elements included in a third row among the plurality of elements included in the target data to third processing elements arranged in the third row among the plurality of processing elements; and controlling the third processing elements so that each of the third processing elements operates on data provided from adjacent third processing elements and the input third element, wherein, in the performing of the pooling, the third processing elements are controlled so that each of the third processing elements operates on operation data provided from adjacent second processing elements in the same column among the second processing elements and the pre-stored operation data to perform the pooling, and wherein the operation data provided from the adjacent second processing elements is an operation result of the operation data provided from the adjacent first processing elements in the same column as the adjacent second processing elements and the pre-stored operation data of the adjacent second processing elements.

14. The method of claim 10, wherein, in the controlling of the first processing elements, the first processing elements are controlled so that each of the first processing elements performs an add operation of the data provided from the adjacent first processing elements and the input first elements, wherein, in the controlling of the second processing elements, the second processing elements are controlled so that each of the second processing elements performs an add operation of the data provided from the adjacent second processing elements and the input second elements, and wherein, in the performing of the pooling, the second processing elements are controlled so that each of the second processing elements performs an add operation of the operation data provided from the adjacent first processing elements in the same column among the first processing elements and the pre-stored operation data to perform average pooling.

15. The method of claim 10, wherein, in the controlling of the first processing elements, the first processing elements are controlled so that each of the first processing elements performs a comparison operation of the first element provided from the adjacent first processing elements and the input first elements, wherein, in the controlling of the second processing elements, the second processing elements are controlled so that each of the second processing elements performs a comparison operation of the second element provided from the adjacent second processing elements and the input second elements, and wherein, in the performing of the pooling, the second processing elements are controlled so that each of the second processing elements performs a comparison operation of the first element provided from the adjacent first processing elements in the same column among the first processing elements and pre-stored second element to perform max pooling.

16. The method of claim 10, wherein each of the plurality of processing elements includes:
a first register; and
a second register, wherein, in the controlling of the first processing elements, the first processing elements are controlled so that each of the first processing elements operates on data provided from the first registers or the second registers of the adjacent first processing elements and first elements stored in the first registers of each of the first processing elements and stores the operated data and first elements in the second registers of each of the first processing elements, and wherein, in the controlling of the second processing elements, the second processing elements are controlled so that each of the second processing elements operates on data provided from the first registers or the second registers of the adjacent second processing elements and second elements stored in the first registers of each of the second processing elements and stores the operated data and second elements in the second registers of each of the second processing elements.

* * * * *